(12) United States Patent
Candel et al.

(10) Patent No.: US 11,315,085 B2
(45) Date of Patent: Apr. 26, 2022

(54) DEVICE, SYSTEM AND METHOD FOR THE MONITORING, CONTROL AND OPTIMIZATION OF A WASTE PICKUP SERVICE

(71) Applicant: GreenQ Ltd., Jerusalem (IL)

(72) Inventors: Edy Candel, Jerusalem (IL); Shlomo Akiva Ashkenazi, Tene Omarim (IL)

(73) Assignee: GREENQ LTD., Jerusalem (IL)

(*) Notice: Subject to any disclaimer, the term of this patent is extended or adjusted under 35 U.S.C. 154(b) by 836 days.

(21) Appl. No.: 15/646,104

(22) Filed: Jul. 11, 2017

(65) Prior Publication Data

US 2019/0019167 A1 Jan. 17, 2019
US 2021/0342793 A9 Nov. 4, 2021

Related U.S. Application Data

(60) Provisional application No. 62/361,525, filed on Jul. 13, 2016.

(51) Int. Cl.
*G06Q 10/00* (2012.01)
*B65F 1/14* (2006.01)
(Continued)

(52) U.S. Cl.
CPC ........... *G06Q 10/30* (2013.01); *B65F 1/1484* (2013.01); *B65F 3/02* (2013.01); *B65F 3/14* (2013.01);
(Continued)

(58) Field of Classification Search
None
See application file for complete search history.

(56) References Cited

U.S. PATENT DOCUMENTS

| 4,773,027 A | 9/1988 | Neumann |
| 8,355,994 B2 * | 1/2013 | Mallett ............... G06Q 30/018 705/308 |

(Continued)

FOREIGN PATENT DOCUMENTS

| CN | 203246756 | 10/2013 |
| CN | 203909569 | 10/2014 |
| WO | 2014079586 | 5/2014 |

OTHER PUBLICATIONS

Greenwalt, Megan, GreenQ Hopes to Help Promote the "internet of Garbage", May 17, 2017, Waste 360, https://www.waste360.com/fleets-technology/greenq-hopes-help-promote-internet-garbage, p. 1-8.*

(Continued)

*Primary Examiner* — Joseph M Waesco
(74) *Attorney, Agent, or Firm* — Naomi S. Rosenman-Helfand

(57) ABSTRACT

A system, method and device for waste measurement for garbage truck fleets operated by waste pickup service are provided. The waste measurement device comprises one or more visible light cameras; one or more volume sensors; and a controller. The waste measurement device is deployed in front of a hopper of the garbage truck and the device is configured to measure the waste volume in the hopper using the volume sensors. The method calculates the waste volume emptied from the waste container by at least subtracting the measurement of the volume in the hopper before loading from the measurement of the volume after loading. The system manages the waste pickup services having garbage truck fleet with the waste measurement devices. The system optimizes and monitors the system operation conditioned upon the measurements provided from the waste measuring devices.

10 Claims, 15 Drawing Sheets

(51) Int. Cl.
  *B65F 3/02* (2006.01)
  *G01F 22/00* (2006.01)
  *G01G 19/08* (2006.01)
  *G06Q 10/06* (2012.01)
  *B65F 3/14* (2006.01)

(52) U.S. Cl.
  CPC ............. *G01F 22/00* (2013.01); *G01G 19/08* (2013.01); *G06Q 10/06315* (2013.01); *B65F 2003/0279* (2013.01); *B65F 2003/146* (2013.01); *B65F 2210/138* (2013.01); *B65F 2210/182* (2013.01); *B65F 2210/184* (2013.01)

(56) References Cited

U.S. PATENT DOCUMENTS

| | | | | |
|---|---|---|---|---|
| 2005/0119933 | A1* | 6/2005 | Mallett | A61B 50/15 340/572.1 |
| 2006/0212306 | A1* | 9/2006 | Mallett | G16H 40/20 206/702 |
| 2006/0212307 | A1* | 9/2006 | Mallett | A61B 50/36 209/702 |
| 2012/0265336 | A1* | 10/2012 | Mallett | A61B 90/96 700/236 |
| 2013/0322994 | A1* | 12/2013 | Curotto | B65F 3/041 414/293 |
| 2014/0182951 | A1 | 7/2014 | Curotto | |
| 2014/0278630 | A1* | 9/2014 | Gates | G06Q 10/0832 705/7.13 |
| 2014/0379588 | A1* | 12/2014 | Gates | G06Q 10/30 705/308 |
| 2015/0294431 | A1* | 10/2015 | Fiorucci | G07B 15/02 705/13 |
| 2016/0167095 | A1* | 6/2016 | Coughlin | B09B 3/0025 405/129.3 |
| 2016/0300297 | A1* | 10/2016 | Kekalainen | G06Q 10/08 |
| 2016/0340120 | A1* | 11/2016 | Curotto | B65F 1/122 |
| 2017/0081120 | A1* | 3/2017 | Liu | B65F 3/00 |
| 2017/0158050 | A1* | 6/2017 | Crist | B60K 15/013 |
| 2018/0035606 | A1* | 2/2018 | Burdoucci | A01D 34/84 |
| 2018/0327183 | A1* | 11/2018 | Peek | E02F 3/413 |
| 2019/0019167 | A1* | 1/2019 | Candel | G06Q 10/30 |
| 2021/0342793 | A9* | 11/2021 | Candel | G01G 19/08 |

OTHER PUBLICATIONS

Mavropoulos, Antonis, Internet of Garbage Trucks, Oct. 4, 2016, Wasteless future, https://wastelessfuture.com/the-internet-of-garbage-trucks/, p. 1-5.*

* cited by examiner

Fig. 13

Collected bins :
419 out of 470 Daily avg

Notifications:

- 05.05.2017: 305 Greenfield St: Waste bin has not been collected
- 05.05.2017: Route duration shorter than regular
- 02.04.2017: 305 Greenfield St: Waste bin has not been collected Capacity avg :
97.3 lb

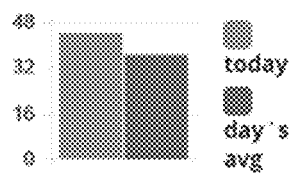

today
day`s avg

Recommendations:

- Increase waste bin volume
- Briefing: repeated waste bin collection failure
- Optimization: Decrease route expA waste pickup frequency Today`s %
capacity
avg

Capcity
Free

Fig. 15

| Show 100 entries | | | | | | Search: |
|---|---|---|---|---|---|---|
| Bin | Cordinates | Address | Scale (lb) | Capacity | Truck | Pickup time |
| 1 | 41.797936,-72.679067 | 262 Cleveland Ave Hartford CT 06120 | 35.0 | 7% | 2948676 | 00:00:05 |
| 2 | 41.793656,-72.680912 | Waverly St Hartford CT 06112 | 174.0 | 56% | 2948676 | 00:00:34 |
| 3 | 41.797552,-72.678609 | 891-893 Garden St Hartford CT 06112 | 89.0 | 52% | 2948676 | 00:01:46 |
| 4 | 41.797313,-72.678750 | 924 Garden St Hartford CT 06112 | 101.5 | 62% | 2948676 | 00:02:12 |
| 5 | 41.798800,-72.680955 | Waverly St Hartford CT 06112 | 83.3 | 47% | 2948676 | 00:02:47 |
| 6 | 41.797072,-72.678938 | 875-889 Garden St Hartford CT 06112 | 126.1 | 82% | 2948676 | 00:03:28 |
| 7 | 41.798480,-72.681041 | Waverly St Hartford CT 06112 | 86.2 | 49% | 2948676 | 00:04:08 |
| 8 | 41.791825,-72.683573 | 256-318 Westland St Hartford CT 06112 | 226.7 | 76% | 2948676 | 00:04:33 |
| 9 | 41.794448,-72.676980 | 325-333 Barbour St Hartford CT 06120 | 119.5 | 77% | 2948676 | 00:05:38 |
| 10 | 41.796848,-72.679067 | 875-889 Garden St Hartford CT 06112 | 14.2 | 12% | 2948676 | 00:05:58 |
| 11 | 41.792145,-72.684732 | 256-318 Westland St Hartford CT 06112 | 51.2 | 20% | 2948676 | 00:06:00 |
| 12 | 41.799425,-72.683444 | 101-121 Love Ln Hartford CT 06112 | 160.0 | 54% | 2948676 | 00:08:12 |
| 13 | 41.792273,-72.685461 | 256-318 Westland St Hartford CT 06112 | 85.5 | 49% | 2948676 | 00:08:37 |
| 14 | 41.796528,-72.679153 | 875-889 Garden St Hartford CT 06112 | 73.2 | 35% | 2948676 | 00:08:50 |
| 15 | 41.793936,-72.677093 | 307-323 Barbour St Hartford CT 06120 | 120.5 | 78% | 2948676 | 00:09:17 |
| 16 | 41.798256,-72.680828 | Cleveland Ave Hartford CT 06112 | 110.4 | 66% | 2948676 | 00:09:46 |
| 17 | 41.798512,-72.678423 | 925-999 Garden St Hartford CT 06120 | 115.6 | 74% | 2948676 | 00:10:08 |
| 18 | 41.792433,-72.685976 | 256-318 Westland St Hartford CT 06112 | 66.9 | 33% | 2948676 | 00:11:00 |
| 19 | 41.798633,-72.678345 | 925-999 Garden St Hartford CT 06120 | 81.6 | 45% | 2948676 | 00:11:49 |
| 20 | 41.793649,-72.677264 | 307-323 Barbour St Hartford CT 06120 | 91.2 | 53% | 2948676 | 00:12:07 |
| 21 | 41.797713,-72.678486 | 262 Cleveland Ave Hartford CT 06120 | 202.4 | 66% | 2948676 | 00:12:53 |
| 22 | 41.793529,-72.686663 | 318 Westland St Hartford CT 06112 | 122.0 | 79% | 2948676 | 00:15:34 |
| 23 | 41.797584,-72.677651 | 262 Cleveland Ave Hartford CT 06120 | 63.3 | 30% | 2948676 | 00:15:52 |

DEVICE, SYSTEM AND METHOD FOR THE MONITORING, CONTROL AND OPTIMIZATION OF A WASTE PICKUP SERVICE

RELATED APPLICATION

This application claims priority to and the benefit of U.S. provisional patent application Ser. No. 62/361,525 filed Jul. 13, 2016, which is incorporated herein by reference in its entirety.

TECHNICAL FIELD

The present invention relates generally to the monitoring, control and optimization of a waste pickup service. More specifically, the present invention relates to a system for monitoring the amount of waste picked up from each waste container by a plurality of garbage trucks, alerting when irregularities occur in the process, aggregating this information into a locale-based waste pickup situational picture, analyzing this information and offering, based on the analysis, an optimized waste pickup solution for that locale.

BACKGROUND

Modern life style creates increasing amounts of waste to be picked up from homes, businesses and markets, all in challenging urban environments. The locale waste pickup service is complex and includes: waste containers, in various sizes and shapes, portable garbage compactors, a fleet of garbage trucks picking up garbage from these waste containers, local and national garbage dumpsters to where the waste is carried to, and of course the employees giving this service to residents.

The current waste pickup service is lacking in concrete data, commencing with information on the amount of garbage collected from each waste container along waste pickup routes and continuing with lack of information on the location of the collected waste containers, the date and time of the pickup, the time it took to collect them in each zone of the locale and the performance of the collection process. Lacking in basic data, managers and locale decision makers fail in successfully managing and optimizing the waste pickup service. Without this basic building block, decision makers cannot monitor the waste pickup service, are not alerted when irregularities occur in the process and cannot construct an aggregated waste pickup service situational picture for the locale under their responsibility, cannot analyze the situation and cannot reach a more optimized solution.

An example can be a street with various residences, one of them with a higher waste production rate than the others. The garbage collecting truck visits this specific street three times each week. If information were to be gathered, on the amount of garbage collected from each of the residence's waste containers, decision makers could come up with a possible solution of adding an additional waste container to the higher rate producing residence, and limiting visits by the garbage truck to twice a week, thus saving money, energy and lowering pollution.

There is thus a need in the art for a new method and system for the monitoring, control and optimization of waste pickup service in urban environments.

U.S. Pat. No. 4,773,027 (Neumann) discloses an automated trash management system for measuring the fullness of a plurality of trash containers, each trash container associated with a packing system having a compression member for engaging and compacting the trash in the container and, optionally having a limit switch activated by the compression member when the compression member is fully extended for controlling the movement of the compression member by the packing system.

The disclosed system of Neumann does not handle mobile trash containers and does not include location information, movement information, identification of connection/removal of the trash container from its compactor and fullness of the trash container for each compression.

U.S. Patent publication No. 2014/0182951 (Curotto) discloses of utilizing a collection bin for a side loading waste collection vehicle. The collection bin includes a weighing system with a processor for measuring the weights of material collected from each waste container and associating this weight with appropriate data, such as the owner of the waste container.

This approach requires a major structural change in the waste collection vehicle itself. That structural change includes removing the body of the vehicle's collection bin, installing sensors between the vehicle's collection bin and the vehicle's chassis, and re-mounting the vehicle's collection bin.

PCT publication No. WO 2014/079586 (Kekalainen et al.) discloses a waste collection system including one or more waste containers for receiving waste, a server system for receiving one or more signals via a wireless communication network from sensor arrangements included on the one or more waste containers for sensing a waste status of the one or more containers. Beneficially, the server system receives one or more signals to compute an optimal strategy for one or more waste collection vehicles to collect waste from the one or more waste containers. The waste collection system is capable of supporting a competitive bidding arrangement for implementing collection of waste for the one or more waste containers.

The disclosed system is based on sensors installed on the waste containers themselves, thus requiring a complex and costly installation on the waste containers, dealing with high energy consumption requirements for each waste container and necessitating the erection of designated communication infrastructure to reach each waste container.

Chinese Utility Model Patent No. 203246756 (Jianchao et al.) discloses an intelligent garbage collection can. The intelligent categorized garbage collection can is provided with a closed garbage inlet door stopper and a radio frequency identification device (RFID) card or a bar code capable of identifying member identity and an automatic collection can opening and closing door stopper.

The disclosed system is based on sensors installed on the waste containers themselves, thus requiring a complex and costly installation on the waste containers, dealing with high energy consumption requirements for each waste container and necessitating the erection of designated communication infrastructure to reach each waste container.

Chinese Utility Model Patent No. 203909569 (Deyi et al.) published Mar. 18, 2014 discloses a detachable type intelligent dustbin management system, which comprises a monitoring and scheduling center, a plurality of detachable intelligent dustbins and vehicle-mounted information terminals. The detachable intelligent dustbins and the vehicle-mounted information terminals are respectively in communication with the monitoring and scheduling center. The vehicle-mounted information terminals are in interaction with the detachable intelligent dustbins to process the information. The vehicle-mounted information terminals are in interactive communication with the monitoring and scheduling center to receive the cleanup and transportation scheduling information issued by the monitoring and scheduling center. The monitoring and scheduling center is used for receiving and processing the information acquired by the detachable intelligent dustbins, and then enabling the automatic monitoring and scheduling operation over the garbage cleanup and transportation process based on the information of the working state of a torque-arm type garbage truck. According to the technical scheme of the utility model, by means of the vehicle-mounted information terminals, dustbins are effectively prevented from being lost or stolen. Meanwhile, the dustbins are positioned at the same time. Therefore, the dustbins can be positioned and tracked in real time.

Please note that the disclosed system is based on sensors installed on the waste containers themselves, thus requiring a complex and costly installation on the waste containers, dealing with high energy consumption requirements for each waste container and necessitating the erection of designated communication infrastructure to reach each waste container.

It is an object of the present invention to provide a simple and low cost solution for monitoring, control and optimization of the waste pickup process in real time. The present invention does not require costly installation or maintenance of sensors on the waste containers themselves and does not require the erection of designated communication infrastructure to reach each waste container. Notably the present invention does not require any change to be made to the structure of existing garbage trucks.

These and other features and advantages of the invention will be enlarged upon in the detailed description of the invention that follows.

SUMMARY

The present invention relates generally to the monitoring, control and optimization of a waste pickup service. More specifically, the present invention relates to measurement of waste picked up from each waste container by a plurality of garbage trucks using a dedicated measurement device.

In accordance with a first aspect of the presently disclosed subject matter, there is provided a system comprising: a waste container type and volume identification device, fitted on a garbage truck, capable of identifying the type and the volume of a waste container; a waste container identification device, fitted on the garbage truck, capable of uniquely identifying the waste container; a waste weighing device, fitted on the garbage truck, capable of weighing the waste in the waste container; a waste container volume detection device, fitted on the garbage truck, capable of measuring the volume of waste in the waste container; a location device, fitted on the garbage truck, capable of providing the geo-location of the garbage truck at any given moment; a storage device, fitted on the garbage truck, capable of storing and retrieving information; a communication device, fitted on the garbage truck, capable of connecting to a network and sending information to the network; and a controller; the controller configured to preform one or more of the following: identify the type and the volume of the waste container; uniquely identify, the waste container; measure, the weight and/or the volume of the waste in the waste container; store, a waste container pickup information record, including the identity of the waste container, the weight of the waste in the waste container, the volume of waste in the waste container, the current geo-location of the garbage truck when the waste container was collected, the date and time of collection on the storage device and additional information regarding the waste container pickup; and send, the waste container collection information through the network to a sever.

In some cases, the system further comprises an RFID tag, fitted on the waste container, capable of transmitting a unique ID over radio frequency.

In some cases, the waste container identification device is an RFID reader, capable of reading the unique ID transmitted by the RFID tag fitted on the waste container.

In some cases, the waste container identification device is a camera and the controller is further configured to: uniquely identify, the waste container by taking the image of the waste container and comparing it to a pre-loaded database of images of all waste containers in the locale.

In some cases, the system further comprises a truck container capacity detection device, fitted on the garbage truck, capable of measuring the capacity remaining in the truck container.

In accordance with a second aspect of the presently disclosed subject matter, there is provided a system comprising one or more portable garbage compactors, each fitted with a controller, the controller configured to: measure, the capacity of the portable garbage compactor at each compacting cycle; store, a waste compression information records, including the each including the identity of the portable garbage compactor, the capacity of the portable garbage compactor, the current geo-location of the portable garbage compactor, the date and time of compression; and send, the waste container collection information through a network to a sever.

In some cases, the system further comprises a compactor container disconnection detection device, fitted on the portable garbage compactor, capable of detecting the disconnection of the portable garbage compactor's container from the portable garbage compactor.

In some cases, the system further comprises a garbage compactor movement detection device, fitted on the portable garbage compactor, capable of detecting movement of the of the portable garbage compactor from one location to the other.

In accordance with a third aspect of the presently disclosed subject matter, there is provided a server comprising a controller, the controller configured to: receive, through a communication device, one or more waste container pickup information record from a plurality of garbage trucks, each including the identity of a waste container, the weight of the waste container, the current geo-location of the garbage truck when the waste container was collected and the date and time of collection and one or more waste compression information records, from a plurality of portable garbage compactors, each including the identity of the portable garbage compactor, the capacity of the portable garbage compactor, the current geo-location of the portable garbage compactor and the date and time; aggregate, the waste container pickup information records and the waste compression information records into a locale waste pickup situational picture; display, the locale waste pickup situational picture to users of the server; monitor, the locale waste pickup process; and alert, users of the server when irregularities occur in the process.

In some cases, the controller is further configured to: obtain, policy rules regarding locale waste pickup process; optimize, the locale waste pickup process by analyzing the locale waste pickup situational picture in respect to the policy rules and produce locale waste process pickup process optimization suggestions; and suggest, the locale waste process pickup process optimization suggestions to users of the server.

According to an aspect of some embodiments of the present invention there is provided a waste measurement device for garbage truck fleets operated by waste pickup service, the waste measurement device comprising: one or more visible light cameras; one or more volume sensors; and a controller, wherein the waste measurement device is deployed in front of a hopper of the garbage truck, and wherein at least one of the visible light cameras field of view is directed to view one or more waste containers during loading of the hopper with a waste, and at least one of the volume sensors field of view is directed to view the waste in the garbage truck hopper, and wherein the controller is configured to measure the waste volume in the hopper using the volume sensors, and the controller measure the waste volume in the hopper before and after one or more waste containers are loaded to the hopper, and wherein the controller uses at least one of the visible light cameras to identify the capacity of the waste containers.

According to some embodiments of the invention, at least one of the volume sensor further comprises infra-red transmitter and infra-red receiver.

According to some embodiments of the invention, at least one of the volume sensor further comprises ultrasound transmitter and ultrasound receiver.

According to some embodiments of the invention, the one or more volume sensors comprise at least two volume sensors that are measuring using different types of radiation or different frequency bands.

According to some embodiments of the invention, the device further comprises GPS.

According to some embodiments of the invention, the device further comprises wireless communication modem and the measurements are reported to a waste pickup service using the wireless communication modem.

According to some embodiments of the invention, the controller calculate the waste volume emptied in each waste container by subtracting the hopper volume measurement taken before the waste containers is loaded to the hopper, from the hopper volume measurement taken after the waste containers is loaded to the hopper.

According to some embodiments of the invention, the controller is configured to measure a waste volume for each waste container wherein a plurality of waste container loaded together in the same load cycle of the garbage truck.

According to some embodiments of the invention, the controller is configured to measure a waste volume of bulk waste.

According to some embodiments of the invention, the controller is configured to receive supplementary information from other devices in the garbage truck.

According to an aspect of some embodiments of the present invention there is provided a method for measurement waste volume of waste containers using garbage truck fleets operated by waste pickup service, the measurement comprises the steps of: (a) measuring the volume of waste in a hopper of the garbage truck; (b) emptying a waste container to the garbage truck hopper; (c) detecting the capacity of the waste container during step (b); (d) measuring the volume of waste in a hopper of the garbage truck after step (b) is completed; (e) calculate the waste volume emptied from the waste container by at least subtracting the measurement of step (a) from the measurement of step (d); and (f) reporting the waste volume of the waste container to a server of the waste pickup service.

According to some embodiments of the invention, the method is further comprises a step of identifying the number of waste containers that are loaded to the hopper in a load cycle.

According to some embodiments of the invention, step (e) calculates the emptied waste volume from each of the plurality of the identified waste container.

According to some embodiments of the invention, the method is further comprises a step of identifying bulk waste loading to the hopper and measure the bulk waste volume loaded to the hopper.

According to some embodiments of the invention, the method is further comprises a step of measuring the date, time and location of each waste container emptying.

According to some embodiments of the invention, measuring the volume of waste in the hopper of the garbage truck is performed by integration of a plurality of measurements of different areas in the hopper of the garbage truck.

According to some embodiments of the invention, step (c) further comprises a step of identifying any one of or any combination of waste container type, waste container ID, and waste container purpose.

According to some embodiments of the invention, the method is further comprises a step of measuring the weight of the waste in the hopper.

According to an aspect of some embodiments of the present invention there is provided a system to manage waste pickup services having garbage truck fleet comprising: a plurality of trucks, the trucks have the waste measuring device of claim 1; and a server, wherein the server collects measurements from the waste measuring devices, and optimize the system operation, conditioned upon the measurements provided from the waste measuring devices.

According to some embodiments of the invention, the optimization is performed on at least one of or any combination of (a) total kilometrage traveled by the fleet; (b) total fuel expenses of the truck fleet; (c) total pollutant emission of the truck fleet; (d) total working hours of the crew that is operating the truck fleet.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

For a better understanding of the invention, with regard to the embodiments described, reference is made to the accompanying drawings, in which:

FIG. 13 is an exemplary screenshot of a top level status screen in accordance with the present invention;

FIG. 15 is an exemplary screenshot of log of garbage collection, in accordance with the present invention.

Figure 1:
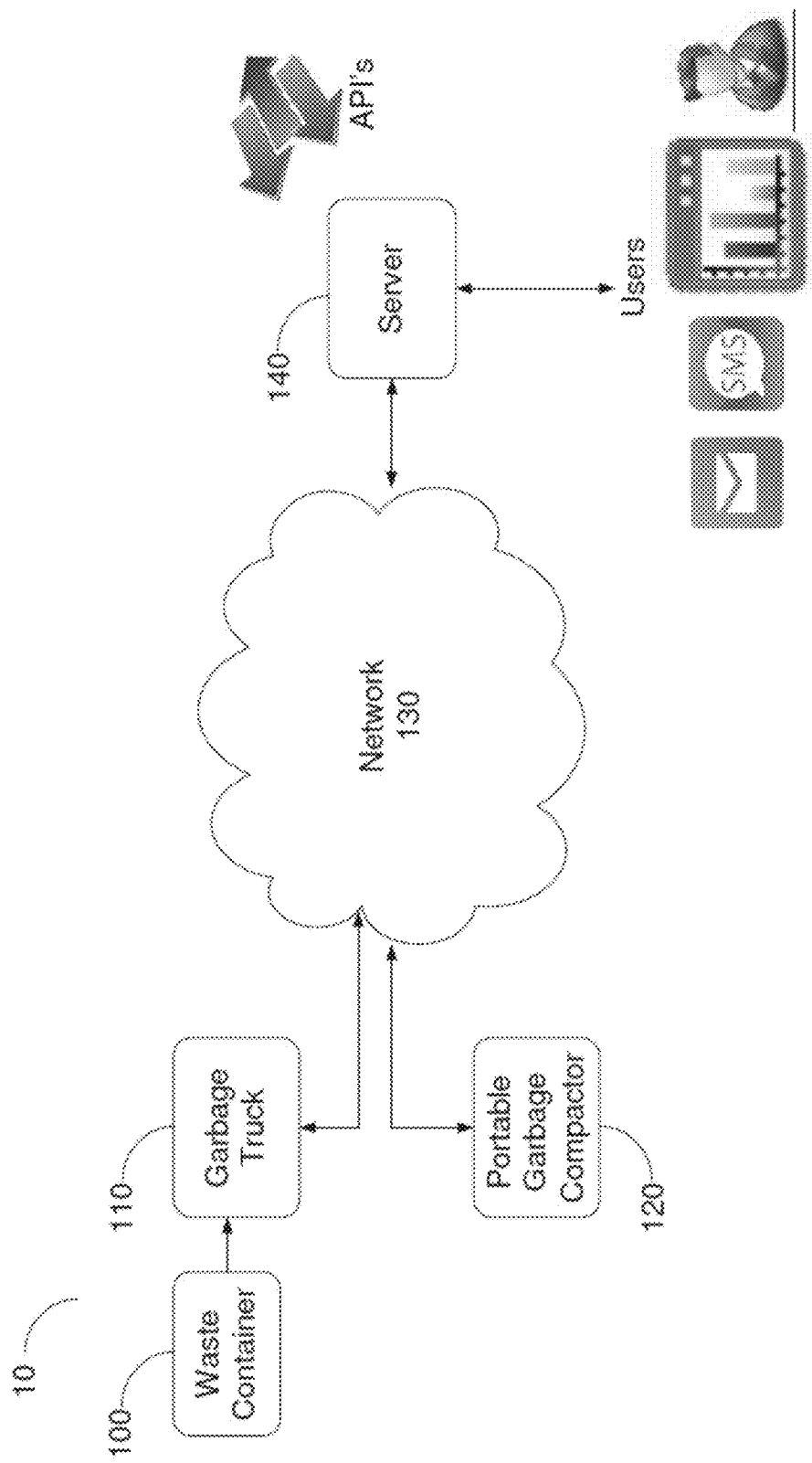
FIG. 1 is a schematic illustration of an environment of a system for the monitoring, control and optimization of waste pickup service, in accordance with the invention.

It will be appreciated that for simplicity and clarity of illustration, elements shown in the drawings have not necessarily been drawn accurately or to scale. Reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the present invention. There is no intention to limit the invention to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

In general overview, the main elements of the invention include, equipping each garbage truck in the locale with a waste container identification device, capable of uniquely identifying a waste container, a waste container weighing device, capable of detecting the weight of the waste in the waste containers and/or a waste container volume detection device, capable of detecting the volume of the waste in the waste container.

As used herein, the term "volume" means three-dimensional measure of space occupied by an object, e.g., a waste.

In practice, the garbage truck uniquely identifies each waste container, as it is brought to the disposal opening of the garbage truck. As the waste container is lifted by the lifting system of the garbage truck for disposal, the weight and/or the volume of the waste in the waste container are measured and recorded. The information recorded from multiple waste containers is sent, through a network, to a server.

In addition, the invention includes equipping each portable garbage compactor in the locale with a compactor container capacity detection device, capable of detecting the capacity of the portable garbage compactor.

In practice, the portable garbage compactor's capacity is measured at each compacting cycle and the waste compression information is recorded. The information records gathered from multiple compacting cycles is sent, through a network, to a server.

The server is capable of receiving and processing the waste container pickup information records and the waste compression information records gathered from a plurality of garbage trucks and from a plurality of portable garbage compactors. The server can alert users of the server when irregularities occur in the process. This information is aggregated into a locale waste pickup situational picture, which is displayed to users of the server at any location.

The server is further capable of obtaining policy rules regarding locale waste pickup process from users of the server. Based on the policy rules, the server can monitor the locale waste pickup process and optimize the locale waste pickup process by analyzing the locale waste pickup situational picture in respect to the policy rules. The server produces locale waste process pickup process optimization suggestions and can suggest them to users of the server at any location.

Bearing this in mind, attention is drawn to FIG. 1, showing a schematic illustration of a system for the monitoring, control and optimization of waste pickup service, in accordance with the presently disclosed subject matter.

According to certain examples of the presently disclosed subject matter, the system 10 includes one or more garbage trucks 110, each equipped with a controller, and a waste container type and volume identification device. Examples of waste container type and volume identification devices include: a camera, to identify each waste container's 100 type and volume based on processing the image of the waste container 100.

According to certain examples of the presently disclosed subject matter, the system 10 includes one or more garbage trucks 110, each equipped with a controller, and each may be equipped with a waste container weighing device for detecting the weight of the waste in the waste containers 100 as those are lifted by the lifting system of the garbage truck 110 for disposal. Such waste container weighing device, may be: a load cell sensor fitted on a lifting system of the garbage truck 110, or a hydraulic pressure sensor fitted on the lifting system of the garbage truck 110, etc.

Each garbage truck 110 may be further equipped with a waste container volume detection device capable of detecting the volume of the waste in the waste containers 100 as those are brought to the garbage truck 110 for disposal either before lifted, or as being emptied by measuring the flow of garbage, or after emptied by measuring the volume of garbage in the basin. Examples include: a radio wave transceiver, a sonic wave transceiver, a laser transceiver, an image processing unit connected to a camera, etc.

Each garbage truck 110 may be further equipped with a waste container identification device. Examples of waste container identification devices include: an RFID reader, capable of reading the unique IDs transmitted by an RFID tag fitted on a waste container 100 as it is brought to the garbage truck 110 for disposal. Alternatively, a camera may be used, to uniquely identify each waste container 100 based on processing the image of the waste container 100, etc.

Each garbage truck 110 is further equipped with a communication device capable of connecting to a network 130. For example: a 3G or a 4G cellular data communication network device, etc.

Each garbage truck 110 is further equipped with a storage device (e.g. a database, a storage system, a memory including Read Only Memory—ROM, Random Access Memory—RAM, or any other type of memory, etc.), configured to store data, including, one or more waste container pickup information records, each including the identity of the waste container 100, the weight of the waste in the waste container 100, the current geo-location of the garbage truck 110 when the waste container 100 was collected, the date and time of collection on the storage device and additional information regarding the waste container pickup.

In use of the system, system 10 pre-learns the location, type and volume of each waste container 100 by manual tagging of all the waste containers 100 and the introduction of information on container type, volume and location into server 140 or by automatically learning of all of the waste containers 100 container type, volume and location in the process of waste pickup service and the interdiction of that information into server 140. Waste container's 100 container type identification will occur either on the garbage truck 110 or on server 140 or utilizing a combination thereof.

In use of the system, the garbage truck 110 may uniquely identifies each waste container 100, as it is brought to the disposal opening of the garbage truck 110. As the waste container 100 is lifted by the lifting system of the garbage truck 110 for disposal, the weight and the volume of the waste in the waste container 100 is measured and recorded. The information recorded from multiple waste containers 100 is sent, through a network 130, to a server 140.

It is an object of the present invention to provide a simple and low cost solution for monitoring, control and optimization of the waste pickup process in real time. The present invention does not require costly installation of sensors on the waste containers 100 themselves and does not require the movement of trash from the waste container 100 to a special collection bin, thus allowing the garbage truck 110 operator to continue with his regular work process. The present invention does not require any change to be made in the structure of the garbage truck 110 and can be installed without requiring changes on any kind of garbage truck 110.

In contrast, prior art systems cannot do provide real time, bottom-up information of the waste pickup process, are costly to install and disturb the normal work procedure of the waste pickup process.

In a preferred embodiment, each garbage truck 110 may be further equipped with a truck container capacity detection device capable of detecting the capacity of the garbage truck 110 compactor. Examples include: a location detector fitted on the garbage truck 110 to locate the position of a discharging blade of the garbage truck 110, a sonic wave transceiver, a laser transceiver, an hydraulic pressure sensor, fitted on the blade system of the garbage truck 110, etc.

Each garbage truck 110 is further equipped with a location device capable of producing the geo-location of the garbage truck 110 in any given moment. For example: a GPS, etc.

Figure 2:
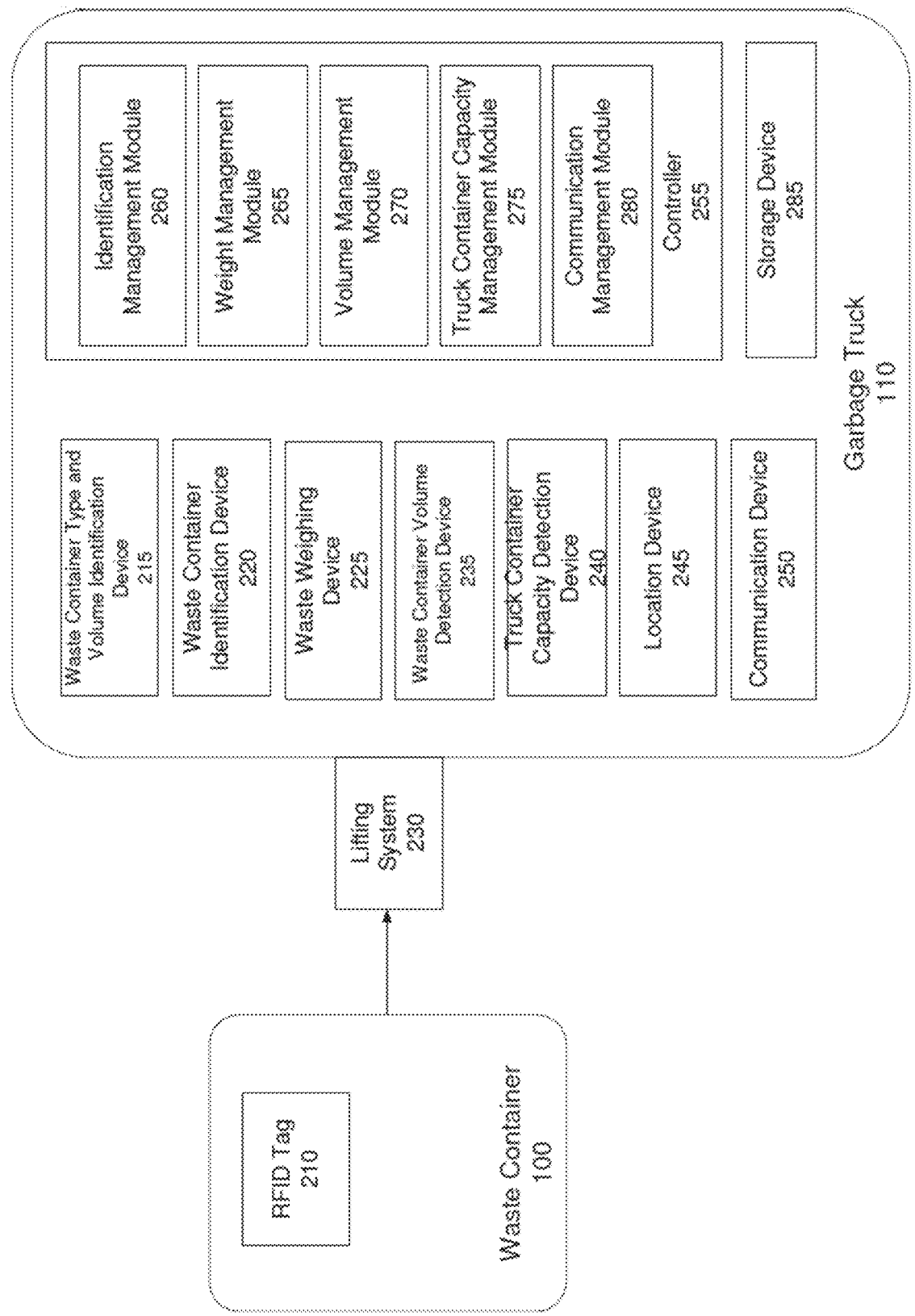
FIG. 2 is a block diagram schematically illustrating one example of a garbage truck and a waste container and the relationship there between, in accordance with the presently disclosed subject matter.

The system 10 further includes one or more waste containers 100, each may be fitted with RFID tags, as further detailed herein, inter alia with reference to FIG. 2.

The system 10 may still further include one or more portable garbage compactors 120, each equipped with a controller, a compactor container capacity detection device capable of detecting the capacity of the portable garbage compactor's 120 container. For example: an hydraulic pressure detector fitted on the hydraulic system of the portable garbage compactor's 120 container to measure the pressure maintained by the compacting blade of the portable garbage compactor 120, etc.

Each portable garbage compactors 120 is further equipped with a communication device capable of connecting to a network 130. For example: a 3G or 4G cellular data communication network device, etc.

Figure 3:
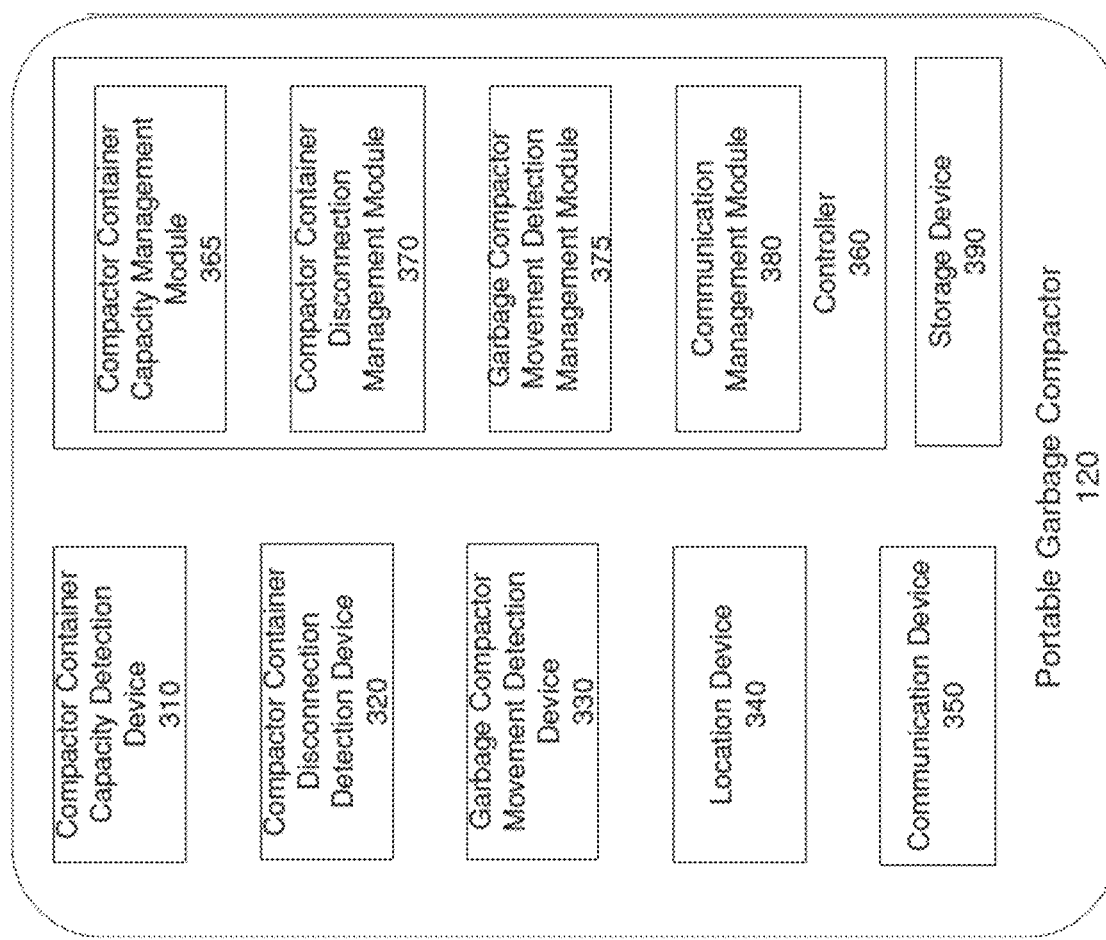
FIG. 3 is a block diagram schematically illustrating one example of a portable garbage compactor, in accordance with the presently disclosed subject matter.

Each portable garbage compactors 120 is further equipped with and a storage device (e.g. a database, a storage system, a memory including Read Only Memory—ROM, Random Access Memory—RAM, or any other type of memory, etc.), configured to store data, including, one or more waste compression information records, each including the identity of the portable garbage compactor 120, the capacity of the portable garbage compactor 120, the current geo-location of the portable garbage compactor 120, the date and time and additional information regarding the waste compression as further detailed herein, inter alia with reference to FIG. 3.

In use of the system, the portable garbage compactor 120 measures the capacity of the portable garbage compactor's 120 container upon each compression. The information recorded from multiple compressions is sent, through the network 130, to a server 140.

In a preferred embodiment, each portable garbage compactors 120 may be further equipped with a compactor container disconnection detection device capable of detecting the disconnection of the portable garbage compactor's 120 container from the portable garbage compactor 120. For example: two magnetic sensors, one fitted on the portable garbage compactor's 120 container and the other fitted opposite to the first on the container itself, etc.

In a preferred embodiment, each portable garbage compactors 120 may be further equipped with a garbage compactor movement detection device (e.g. an accelerometer fitted on the portable garbage compactor 120 measuring the proper acceleration of the portable garbage compactor 120, thus indicating movement, a 3-axis inclinometer fitted on the portable garbage compactor 120 measuring the tilt of the portable garbage compactor 120, thus indicating movement, etc.), capable of detecting movement of the of the portable garbage compactor 120 from one location to the other.

In a preferred embodiment, each portable garbage compactors 120 may be further equipped with a location device (e.g. GPS, etc.), capable of producing the geo-location of the portable garbage compactor 120 in any given moment.

The system 10 still further includes a server 140. The server 140 having a controller and a communication device (e.g. a wired internet connection, etc.), capable of connecting to network 130, and a storage device (e.g. a database, a storage system, a memory including Read Only Memory—ROM, Random Access Memory—RAM, or any other type of memory, etc.), configured to store data, including, one or more waste container pickup information records, one or more waste compression information records and additional information as further detailed herein, inter alia with reference to FIG. 4.

Attention is now drawn to FIG. 2, showing a block diagram schematically illustrating one example of a garbage truck and a waste container and the relationship there between, in accordance with the presently disclosed subject matter.

The garbage truck 110 can comprise or be otherwise associated with a storage device 285 (e.g. a database, a storage system, a memory including Read Only Memory—ROM, Random Access Memory—RAM, or any other type of memory, etc.) configured to store data, including, inter alia, one or more waste container pickup information records, as further detailed herein. In some cases, storage device 285 can be further configured to enable retrieval and/or update and/or deletion of the stored data. It is to be noted that in some cases, storage device 285 can be distributed.

The garbage truck 110 may further includes a waste container type and volume identification device 215 (e.g. an RFID reader, capable of reading the unique IDs transmitted by an RFID tag on a waste container 100 as it is brought to the garbage truck 110 for disposal and receiving through server 140 the type and volume of that waste container, a camera, capable of identifying the type and volume of the waste container 100 based on processing the image of the waste container 100, a sonic wave transceiver capable of identifying the type and volume of the waste container utilizing sound waves, etc.), capable of identifying the type and the volume of the waste container 100, a waste container identification device 220 (e.g. an RFID reader, capable of reading the unique IDs transmitted by an RFID tag on the waste container 100 as it is brought to the garbage truck 110 for disposal, a camera, capable of uniquely identifying each waste container 100 based on processing the image of the waste container 100, etc.), capable of uniquely identifying a waste container 100, a waste container weighing device 225 (e.g. a load cell sensor fitted on a lifting system 230 of the garbage truck 110, an hydraulic pressure sensor fitted on the lifting system 230 of the garbage truck 110, etc.), capable of detecting the weight of the waste in the waste containers 100 as those are lifted by the lifting system 230 of the garbage truck 110 for disposal, a waste container volume detection device 235 (e.g. a radio wave transceiver, a sonic wave transceiver, a laser transceiver, an image processing unit connected to a camera, etc.), capable of detecting the volume of the waste in the waste containers 100 as those are brought to the garbage truck 110 for disposal either before lifted, or as being emptied by measuring the flow of garbage, or after emptied by measuring the volume of garbage in the basin, a truck container capacity detection device 240 (e.g. a location detector fitted on the garbage truck 110 to locate the position of a discharging blade of the garbage truck 110, a sonic wave transceiver, a laser transceiver, an hydraulic pressure sensor, fitted on the blade system of the garbage truck 110, etc.), capable of detecting the capacity of the garbage truck 110 compactor, a location device 245 (e.g. GPS, etc.), capable of producing the geo-location of the garbage truck 110 in any given moment, a communication device 250 (e.g. 3G or 4G cellular data communication network, etc.), capable of connecting to a network 130 (e.g. a data communication network).

The garbage truck 110 further includes a controller 255. Controller 255 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant garbage truck 110 resources and for enabling operations related to garbage truck 110 resources.

The controller 255 can comprise one or more of the following modules: identification management module 260, weight management module 265, volume management module 270, truck container capacity management module 275 and a communication management module 280.

The identification management module 260 can be configured to identify the type and volume of the waste container, utilizing the waste container type and volume identification device 215 and to identify the location of the waste container 100 and of the garbage truck 110 when picking up the waste container 100, and may be configured to uniquely identify the waste container 100.

The weight management module 265 can be configured to obtain the weight of the waste in the waste container 100.

The volume management module 270 can be configured to obtain the volume of the waste in the waste container 100.

The truck container capacity management module 275 can be configured to obtain the capacity of the garbage truck 110 compactor.

The communication management module 280 can be configured to connect to the network 130 and send information to a server 140 through the network.

Attention is now drawn to FIG. 3, showing a block diagram schematically illustrating one example of a portable garbage compactor, in accordance with the presently disclosed subject matter.

The portable garbage compactor 120 can comprise or be otherwise associated with a storage device 390 (e.g. a database, a storage system, a memory including Read Only Memory—ROM, Random Access Memory—RAM, or any other type of memory, etc.) configured to store data, including, inter alia, one or more waste container pickup information records, as further detailed herein. In some cases, storage device 390 can be further configured to enable retrieval and/or update and/or deletion of the stored data. It is to be noted that in some cases, storage device 390 can be distributed.

The portable garbage compactor 120 further includes a compactor container capacity detection device 310 (e.g. an hydraulic pressure detector fitted on the hydraulic system of the portable garbage compactor's 120 container to measure the pressure maintained by the compacting blade of the portable garbage compactor 120, etc.), capable of detecting the capacity of the portable garbage compactor's 120 container, a compactor container disconnection detection device 320 (e.g. two magnetic sensors, one fitted on the portable garbage compactor's 120 container and the other fitted opposite to the first on the container itself), capable of detecting the disconnection of the portable garbage compactor's 120 container from the portable garbage compactor 120, a garbage compactor movement detection device 330 (e.g. an accelerometer fitted on the portable garbage compactor 120 measuring the proper acceleration of the portable garbage compactor 120, thus indicating movement, a 3-axis inclinometer fitted on the portable garbage compactor 120 measuring the tilt of the portable garbage compactor 120, thus indicating movement, etc.), capable of detecting movement of the of the portable garbage compactor 120 from one location to the other, a location device 340 (e.g. GPS, etc.), capable of producing the geo-location of the portable garbage compactor 120 in any given moment, a communication device 350 (e.g. 3G or 4G cellular data communication network, etc.), capable of connecting to a network 130 (e.g. a data communication network).

The portable garbage compactor 120 further includes a controller 360. Controller 360 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant portable garbage compactor 120 resources and for enabling operations related to portable garbage compactor 120 resources.

The controller 360 can comprise one or more of the following modules: compactor container capacity management module 365, compactor container disconnection management module 370, garbage compactor movement detection management module 375 and a communication management module 380.

The compactor container capacity management module 365 can be configured to obtain the capacity of the portable garbage compactor's 120 container, after each compacting cycle.

The compactor container disconnection management module 370 can be configured to identify when the portable garbage compactor's 120 container is disconnected from the portable garbage compactor 120.

The garbage compactor movement detection management module 375 can be configured to detect relocation, lifting, striking or any other movement of the portable garbage compactor 120 from one location to the other by utilizing the location device 340.

The communication management module 380 can be configured to connect to the network 130 and send information to a server 140 through the network.

Figure 4:
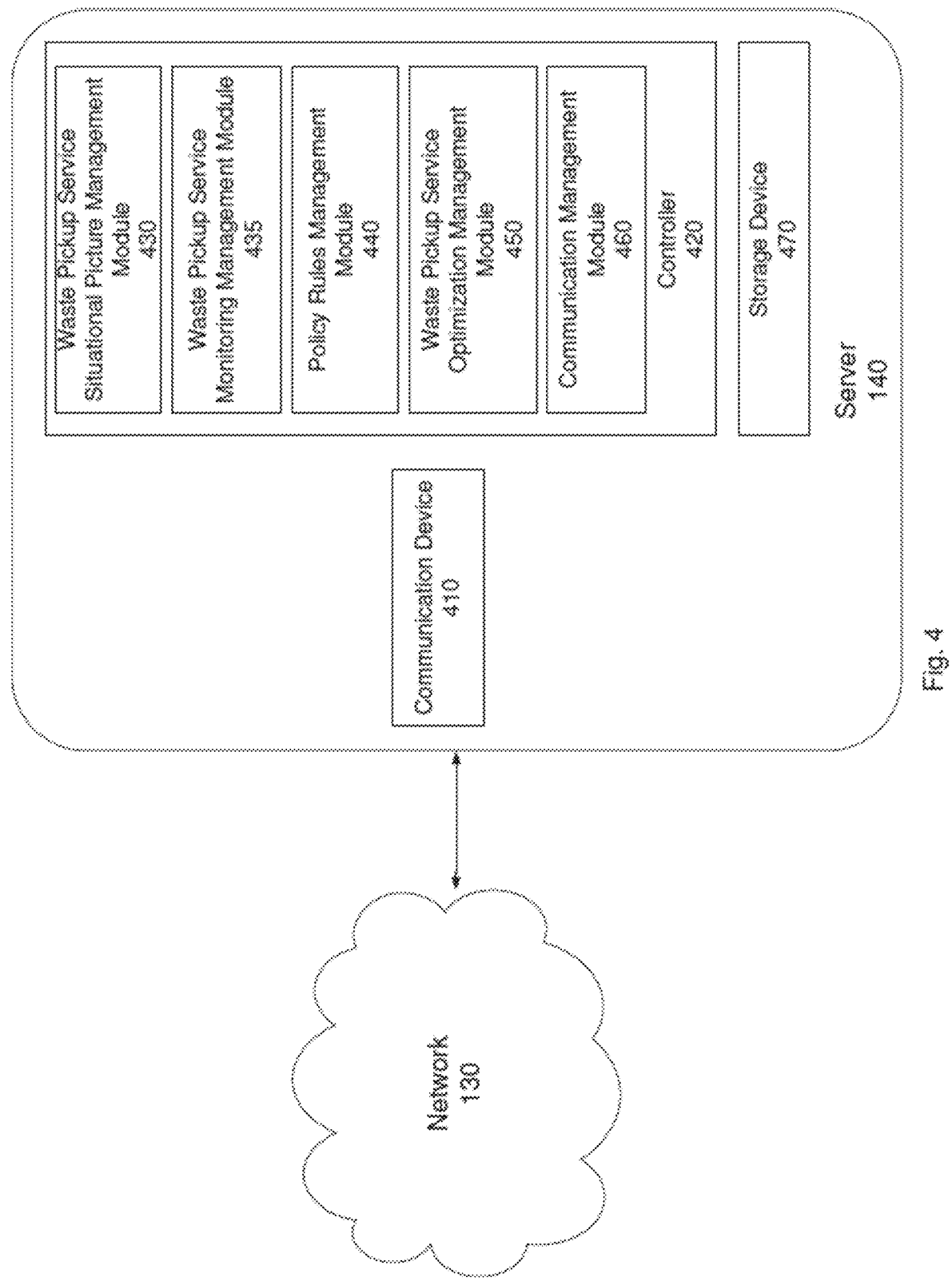
FIG. 4 is a block diagram schematically illustrating one example of a server connectable to a network, in accordance with the presently disclosed subject matter.

Attention is now drawn to FIG. 4, showing a block diagram schematically illustrating one example of a server connectable to a network, in accordance with the presently disclosed subject matter.

The server 140 can comprise or be otherwise associated with a storage device 470 (e.g. a database, a storage system, a memory including Read Only Memory—ROM, Random Access Memory—RAM, or any other type of memory, etc.) configured to store data, including, inter alia, one or more waste container pickup information records, one or more waste compression information records and additional information, as further detailed herein. In some cases, storage device 470 can be further configured to enable retrieval and/or update and/or deletion of the stored data. It is to be noted that in some cases, storage device 470 can be distributed.

The server 140 further includes a communication device (e.g. a wired internet connection, etc.), capable of connecting to a network 130 and receiving information from a plurality of garbage trucks 110 and a plurality of portable garbage compactors 120.

The server 140 further includes a controller 420. Controller 420 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant server 140 resources and for enabling operations related to server 140 resources.

The controller 420 can comprise one or more of the following modules: waste pickup service situational picture management module 430, waste pickup service monitoring management module 435, policy rules management module 440, waste pickup service optimization management module 450 and a communication management module 460.

The waste pickup service situational picture management module 430 can be configured to receive the waste container pickup information records and the waste compression information records and aggregate them into a locale waste pickup situational picture.

The waste pickup service monitoring management module 435 monitors the waste pickup service and may on-line alert users of the server 140 when irregularities are recognized in the process.

The policy rules management module 440 can be configured to obtain policy rules regarding locale waste pickup process from users of the server 140 (e.g. avoid collecting garbage at designated residential areas during sleeping hours as to not to disturb the residents, avoid collecting garbage near kindergartens and schools while children are being dropped off or picked up thus prevention traffic congestion in the area, avoid using major traffic arteries during rush hour in order to prevent traffic jams, collect the bins when they are almost completely filled or pick them when still some room is left for additional garbage, frequency of evacuation according to the seasons or temperature or humidity thus preventing odors, reinforcement of garbage collection before or after special events, etc.).

The waste pickup service optimization management module 450 can be configured to optimize the locale waste pickup process by analyzing the locale waste pickup situational picture in respect to the policy rules and produce locale waste process pickup process optimization suggestions (e.g. suggest the change in the frequency of garbage collection in accordance to the rate of garbage production, suggest the normalization of filling levels by adding additional waste containers in specific addresses, suggest the physical layout of waste containers in accordance with the actual garbage producing rate, suggest change in routes, frequency and hours of waste pickup, suggest the start time of waste pickup in areas where relatively little waste is produced followed by pickup in places where large amount of garbage are produced thus saving in fuel and reducing air pollution, etc.).

The communication management module 460 can be configured to connect to the network 130 and receive information from a plurality of garbage trucks 110 and a plurality of portable garbage compactors 120, through the network 130.

Figure 5:
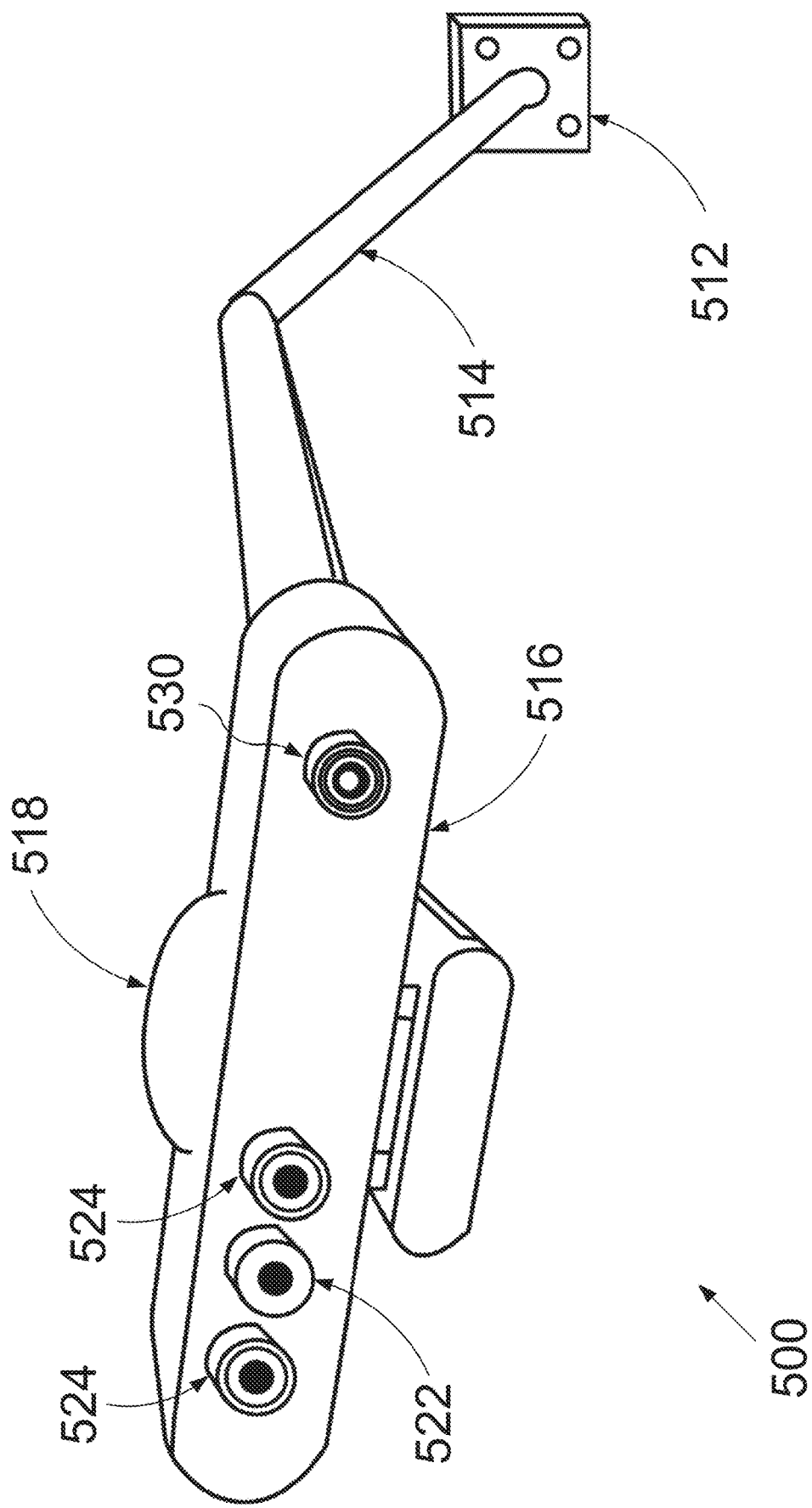
FIG. 5 is an isometric view of a waste measurement device, in accordance with the present invention.

Reference is made now to FIG. 5. FIG. 5 illustrates an isometric view of a waste measurement device 500 in accordance with the present invention. Waste measurement device 500 comprises: an anchor 512 that mechanically connects waste measurement device 500 to garbage truck 110; an arm 514 that positions waste measurement device 500 in the desired place relative to garbage trucks hopper; a case 516 comprises the electronics circuits described later on; optionally, antennas radome 518, which covers the waste measurement device 500 antennas; one or more visible light cameras 530 (one camera is illustrated in the figure); and one or more volume sensors comprised of one or more transmitter sections 522 (one transmitter section is illustrated in the figure) and one or more receiver sections 524 (two receiver sections are illustrated in the figure).

As used herein, the term "volume sensor" means an element or a plurality of elements that, optionally together with additional auxiliary hardware and/or software, measure the volume of objects or the space between objects.

By using anchor 512, waste measurement device 500 can be easily installed on any existing garbage truck.

Arm 514 is configured to deploy waste measurement device 500 in a position that enables transmitter section 522 to illuminate the truck hopper. This position of arm 514 additionally directs receiver section 524 and visible light camera 530 field of views towards the truck hopper as well.

In an exemplary embodiment of the invention, waste measurement device 500, in general, and case 516, in particular, are configured to meet harsh environmental conditions such as vibration, dust, corrosive waste materials, and the like, and a variety of weather conditions, such as, rain, fog, ice, snow and the like.

Inside antennas radome 518, a GPS antenna and a cellular communication antenna may be deployed. Optionally, the antennas may be deployed inside case 516. Yet another option is that external antennas are used.

Waste measurement device 500 may be deployed in any type of garbage truck.

Figure 6:
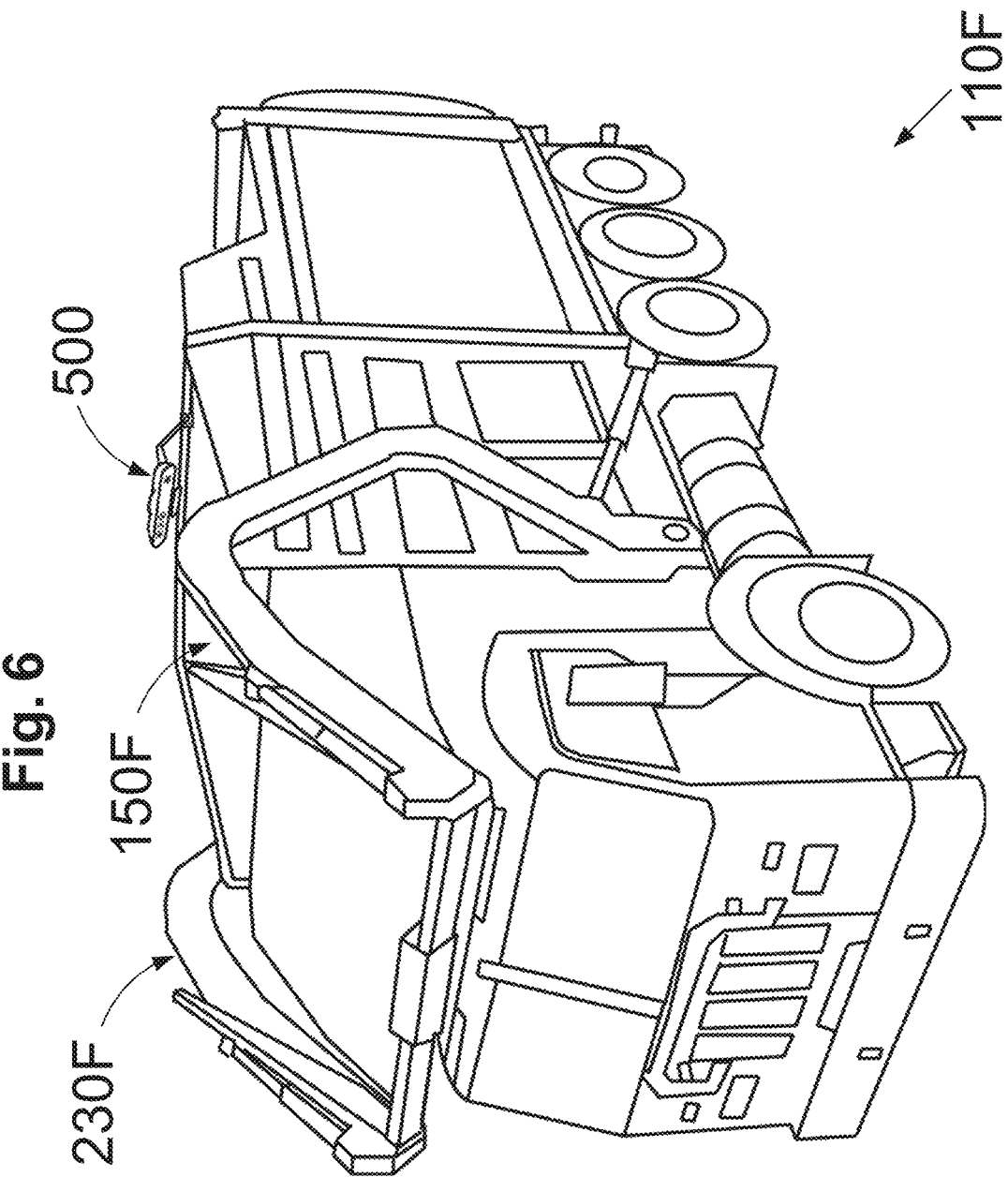
FIG. 6 is an isometric view of a waste measurement device installation on front loader garbage truck, in accordance with the present invention.
Figure 7:
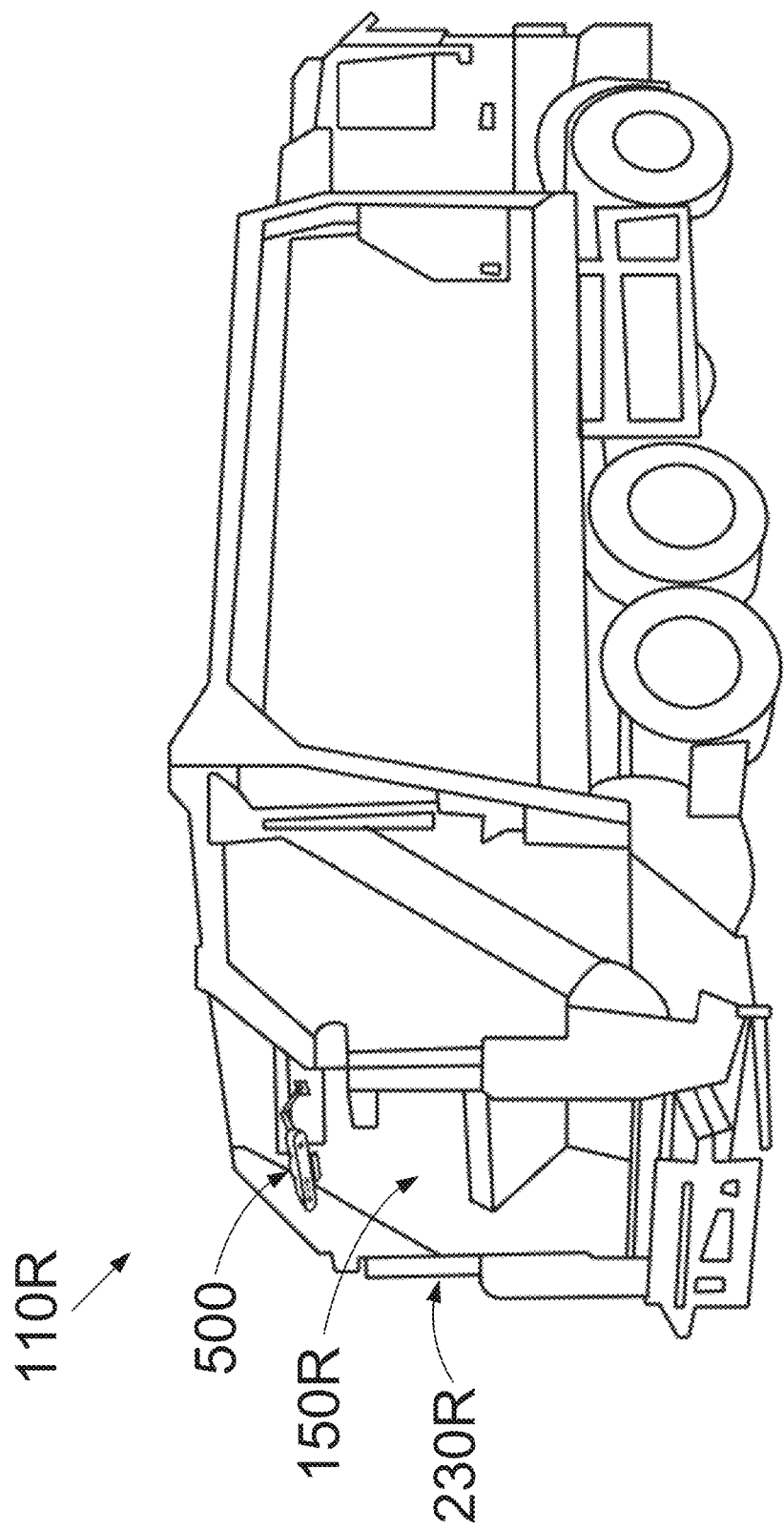
FIG. 7 is an isometric view of a waste measurement device installation on rear loader garbage truck, in accordance with the present invention.
Figure 8:
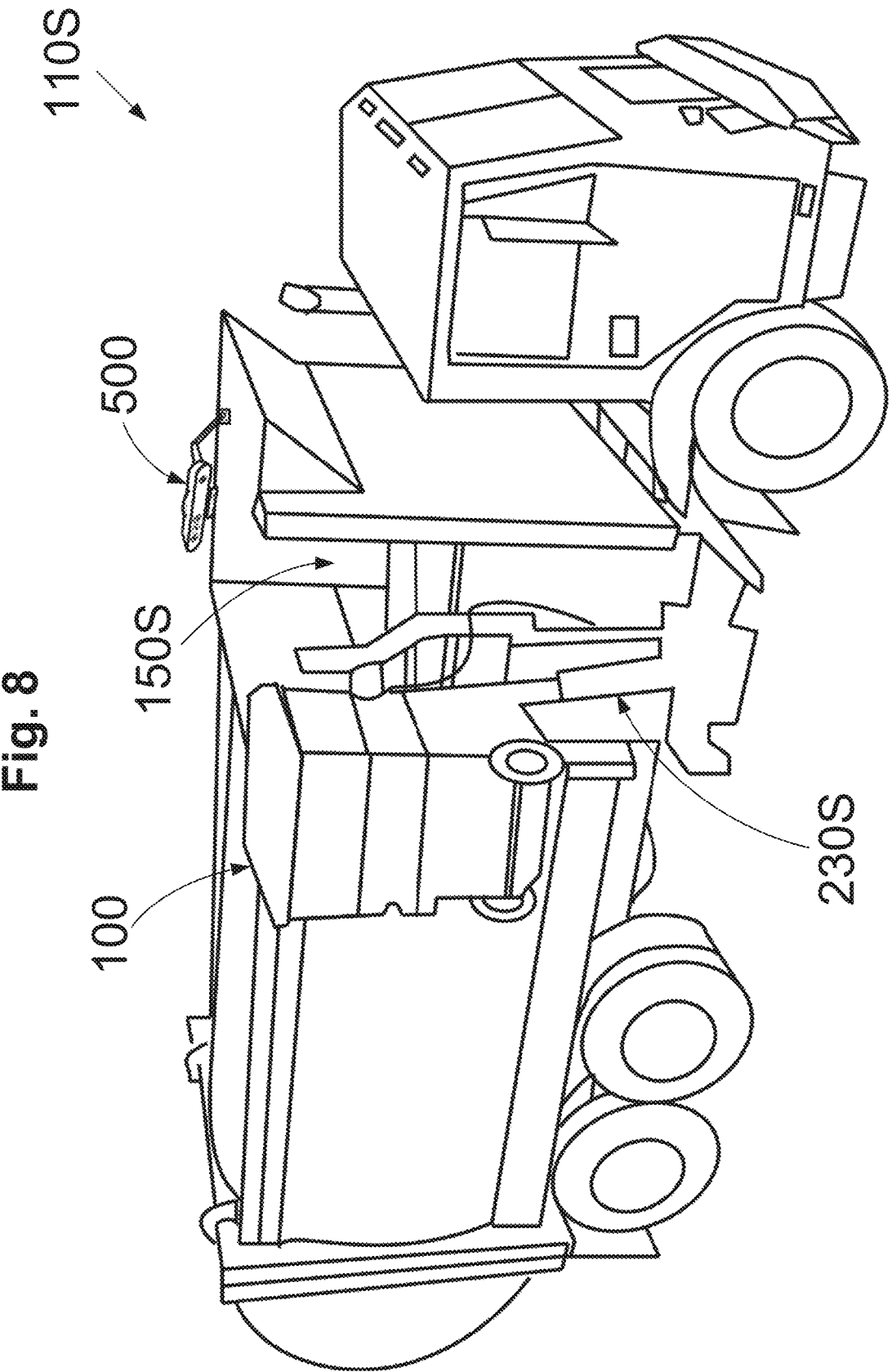
FIG. 8 is an isometric view of a waste measurement device installation on side loader garbage truck, in accordance with the present invention.

FIGS. 6-8 illustrate exemplary deployments of the waste measurement device in garbage trucks with front loader, rear loader and side loader respectively.

Reference is made now to FIG. 6. FIG. 6 illustrates an isometric view of a waste measurement device 500 installation on front loader garbage truck 110F. Garbage truck 110F comprises a hopper 150F and a lift system 230F. Lift system 230F lifts the waste containers and unloads their waste content into hopper 150F. Waste measurement device 500 is deployed over the rear top side of hopper 150F.

Reference is made now to FIG. 7. FIG. 7 illustrates an isometric view of a waste measurement device 500 installation on rear loader garbage truck 110R. Garbage truck 110R comprises a hopper 150R and a lift system 230R. Lift system 230R lifts the waste containers and unloads their waste content into hopper 150F. Waste measurement device 500 is deployed over the top rear side of garbage truck 110R. In Garbage truck 110R, hopper 150R opening is located low enough to allow the garbage truck crews to manually load garbage to hopper 150R. As will be elaborated later, waste measurement device 500 may measure such operations too. It is one goal of the present invention to allow the use of the system without changing or disrupting the regular workflow of the garbage truck crew.

Reference is made now to FIG. 8. FIG. 8 illustrates an isometric view of a waste measurement device 500 installation on side loader garbage truck 110S. Garbage truck 110S comprises a hopper 150S and a lift system 230S. Lift system 230S lifts a waste container 100. Once waste container 100 gets to the top, the container is then flipped upside down and the waste or recyclable material is emptied into hopper 150S of garbage truck 110S. Waste measurement device 500 is deployed at the opposite side of the loading in the top of hopper 150S. Waste measurement device 500 measures the volume of waste in hopper 150S in various stages of waste pickup operation. Once enough waste is dumped, the waste in hopper 150S is compacted by a hydraulically powered moving wall that pushes the waste to the rear of Garbage truck 110S. Optionally, other compacting means such as spirals, grinder or shredders and electrical compactors may be used.

Figure 9:
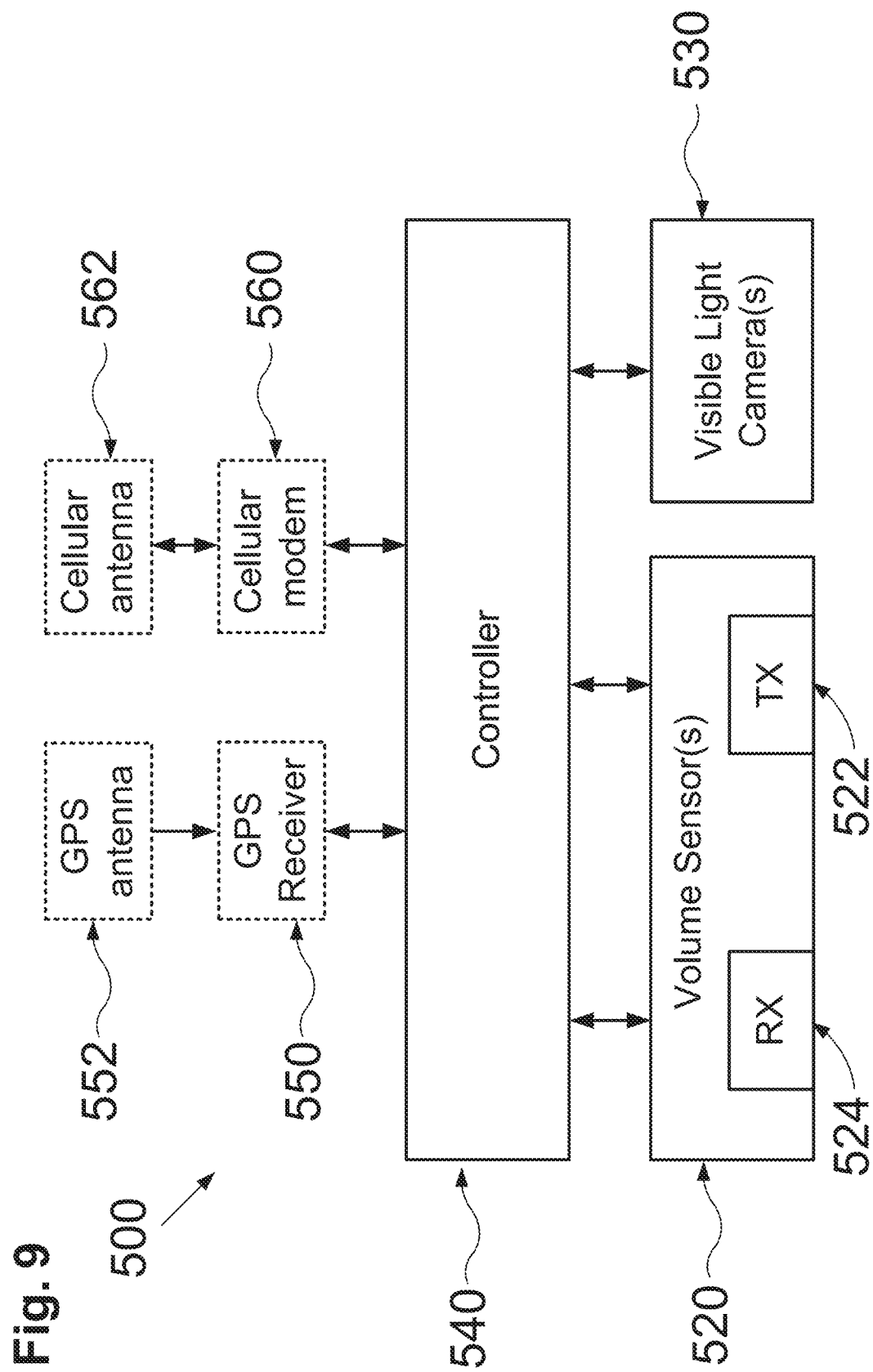
FIG. 9 is a schematic block diagram of a waste measurement device, in accordance with the present invention.

Reference is made now to FIG. 9. FIG. 9 illustrates a schematic block diagram of a waste measurement device 500, in accordance with the present invention. Waste measurement device 500 comprises: one or more visible light cameras 530; one or more volume sensors 520; and a controller 540. Optionally, measurement device 500 comprises GPS receiver 550 with a GPS antenna 552 to collect the locations of the waste containers. Alternatively, any other position or location measurement system may be used to report the truck location. Optionally, measurement device 500 comprises a communication device 560, such as a cellular modem with a cellular antenna 562, to report waste pickup information to the system server. Alternatively, any other wireless communication modem may be used to report the measurements to the waste pickup service, using the wireless communication modem. Additionally or alternatively, the waste pickup information is stored in a local storage of measurement device 500 and is transferred to the system server at a later time.

Volume sensor 520 is an active sensor with a transmitter section 522 and receiver section 524. The transmitter section 522 illuminates the truck hopper and the volume is measured by the reflections from the garbage in the truck hopper.

In an exemplary embodiment of the invention, transmitter section 522 transmits Infra-red (IR) radiation and the IR emitting component is IR LED, IR Laser or the like. The receiver section 524 in this case is IR camera or any other IR detector.

In another exemplary embodiment of the invention, transmitter section 522 transmits ultrasound waves (US) and the US emitting component is a speaker, a piezoelectric vibrator or the like. The receiver section 524, in this case, is a microphone, a piezoelectric sensor, or the like.

In yet another exemplary embodiment of the invention, transmitter section 522 and receiver section 524 use different electromagnetic frequencies bands, such as radio waves, or other sound wave bands, such as infrasound.

In an exemplary embodiment of the invention, a plurality of volume sensors 520 are used. Multiple volume sensors may increase the field of view. Multiple volume sensors may be used to increase the accuracy of the volume measurements. Optionally, volume sensors 520 may use different type of radiation or waves (e.g. electromagnetic waves or sound waves) or different frequency bands.

Visible light camera 530, is used to identify the waste container type. As used herein, the term "waste container type" means the size and shape of the waste container. Usually, the waste pickup service uses only a few types of waste containers that are different mainly in their container capacity. As used herein, the term "capacity" means the maximum volume of the waste container. Controller 540, by analyzing the visual information from visible light camera 530, identifies the type of the container that is currently being emptied. Identifying the type of container from possible types used in the waste pickup service determines the capacity of the waste container.

Optionally, identification includes the waste container purpose and waste container ID. As used herein, the term "waste container purpose" means the planned waste content of the waste container. The planned waste content may be glass, plastic, paper or the like for the purpose of recycling or separation between bio waste and none-bio waste or the like. The waste container purpose is usually identified by the color of the waste container. In some cases, the type of the waste container has a one to one mapping with the waste container purpose while in other cases the same type of waste container is used for different purposes and only a color code marks their purpose.

As used herein, the term "visible light camera" means a camera that can sense light in at least a portion of the visible spectrum, i.e., wavelengths from about 390 to 700 nm. The term "visible light camera" also applies to cameras that sense light spectrum that in addition to the at least a portion of the visible light cover wider spectrum either to the shorter wavelength (ultraviolet light) or to the larger wavelength (infrared light).

As used herein, the term "waste container ID" means the specific waste container. Container ID may be identified by a printed tag or sticker on the container. The tag may be a unique ID number or, in many cases, the address of the house where the waste container is deployed.

In an exemplary embodiment of the invention, controller 540 identifies the container ID by analyzing the written or printed marking of the waste garbage using the visual information from visible light camera 530. Additionally or alternatively, the ID is analyzed using OCR algorithms to identify printed and hand written texts. Additionally or alternatively, the waste container has an RFID tag and the controller 540 reads the waste container ID using an RFID reader.

In an exemplary embodiment of the invention, identification of the waste container, is done using image processing algorithms running on data of still images taken from visible light camera 530. Additionally or alternatively, the image processing is done on the video stream during emptying of the waste container. Optionally, identification of the waste container type is performed by comparing the imaging date to a pre-loaded bank of waste container images.

In an exemplary embodiment of the invention, controller 540 calculates the waste volume emptied in each waste container by subtracting the hopper volume measurement taken before the waste containers is loaded to the hopper, from the hopper volume measurement taken after the waste containers is loaded to the hopper.

In an exemplary embodiment of the invention, controller 540 is configured to measure a waste volume for each waste container, when a plurality of waste containers is loaded together in the same load cycle of the garbage truck.

In an exemplary embodiment of the invention, controller 540 is configured to measure a waste volume of bulk waste.

In an exemplary embodiment of the invention, controller 540 is configured to receive supplementary information, such as waste weight, truck status, weather status and the like, from other devices in the garbage truck.

In a less preferable, yet another exemplary embodiment of the invention, at least one volume sensor 520 is used to identify the waste container type. In this case, visible light camera 530 may be omitted from device 500.

Figure 10:
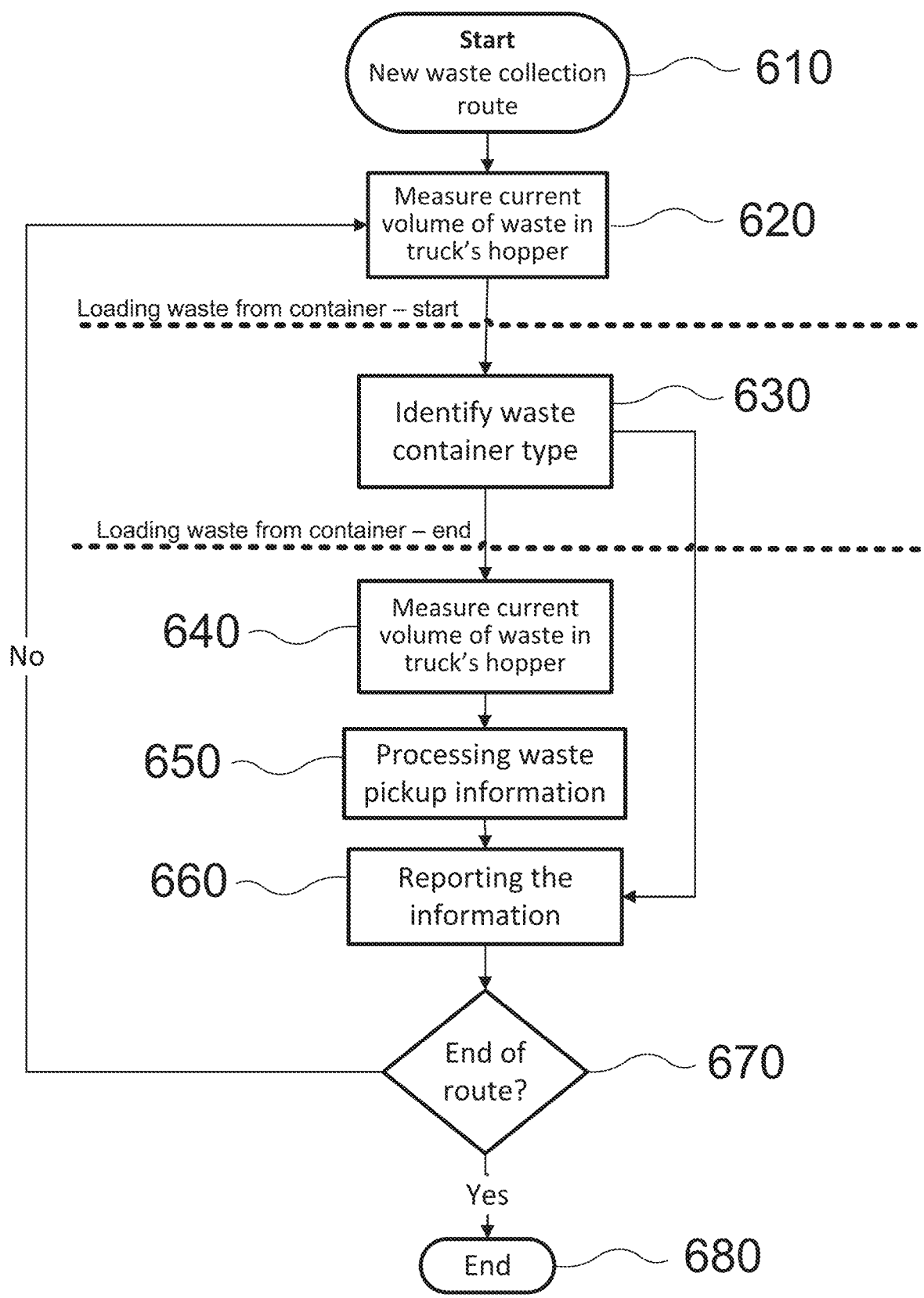
FIG. 10 is a flowchart of a method to measure waste volume of waste containers by garbage truck, in accordance with the present invention.

Reference is now made now to FIG. 10. FIG. 10 is a flowchart of a method to measure volume of waste collected by a garbage truck in accordance with the present invention. The method starts in step 610 when the garbage truck starts its waste collection route. In step 610 the waste truck is located near a waste container and ready to empty the waste container, i.e., to load the waste container content to the truck hopper. Just before the loading starts, in step 620, a measurement of the current amount of waste in the truck's hopper is performed. Next, during the loading of the waste from the container to the hopper, step 630 identifies the waste container type. After the loading completed, in step 640, the current amount of waste in the truck's hopper is measured again. Usually, the start and end of loading is determined automatically using the state of the garbage truck's lift that automatically lifts up, flips and brings down the waste containers. However, this method can be used with manual loading as well. The timing of measurement taking for a manual lift is determined either manually by pressing a button or the like or, preferably, is automatically performed by optical identification of a manual loading operation.

Next, step 650, processes all the data and compute the waste volume that was in the waste container. The volume of waste that was in the container is the difference of the volume in the hopper after and before loading the waste from the container to the hopper. Note that, in general, the hopper is cleared and the waste is compacted and moved to the truck's container after several cycles of loading. However, since the measurement was made before and after each loading cycle, the waste volume in the waste containers was measured accurately.

In an exemplary embodiment of the invention, processing waste pickup information is performed by at least subtracting, the waste volume in the hopper measurement taken before the waste containers is loaded to the hopper, from the waste volume in the hopper measurement taken after the waste containers is loaded to the hopper.

Next, in step 660, reporting the reading of the volume of the specific waste bin is performed. The reporting may be done online by sending the information by communication means to the waste pickup system server, or offline by storing the information locally and fetching it later when the truck end its route. Step 670 checks if the route of the truck is finished. If not, the measurements continue by jumping back to step 620 and reporting additional volumes of the other waste containers emptied during the truck's route, until all waste containers planned for the truck's route have been picked up.

Figure 11:
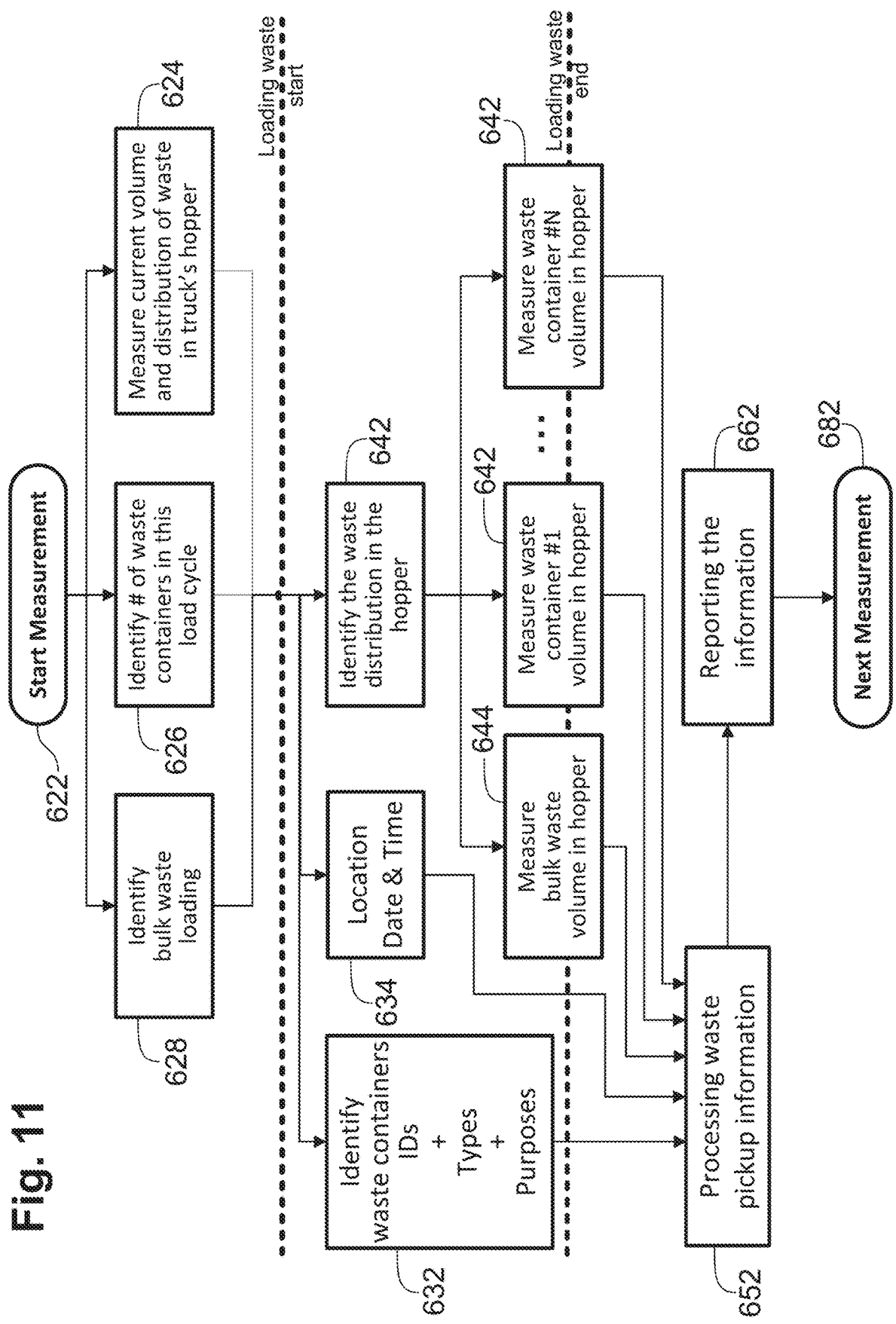
FIG. 11 is a more complete exemplary flowchart of the method to measure waste volume, in accordance with the present invention.

Reference is now made to FIG. 11. FIG. 11 is a more complete exemplary flowchart of the method to measure waste volume. The scenario of loading the hopper in FIG. 11 includes a plurality of waste containers loaded simultaneously with bulk waste, all loaded together into the truck's hopper in the same load cycle.

The term "bulk waste" means any waste that is too large to be accepted by the regular waste containers or any waste that from any other reason is loaded directly to the hopper without using the waste containers.

The term "load cycle" means a single operation of the lift system where one or more waste containers are lifted, flipped, emptied and brought back to their initial position together.

Bulk waste, either loaded manually or loaded using a dedicated crane, such as a knuckle-boom crane, is automatically measured. The measurement of bulk waste loaded is done without any intervention or burden to the garbage truck crew.

After the truck is located in step 622, and just before the loading, step 624 performs a measurement of the current waste volume in the hopper as well as a measurement of the distribution of the waste. In parallel, step 626 performs identifying of the number of waste containers that are attached to the lift. Identification of the presence of bulk waste being loaded 628 is performed as well. Now the load cycle starts and the waste from all sources is piled up in the hopper. To accurately estimate the contribution of each source, step 642 tracks the dynamics of the waste pile accumulation in the hopper. Steps 642 and 644 measure the volume of each waste source based on the dynamics of the waste distribution in the hopper. The calculation is based on the locality of the waste pile in the hopper, for each waste source, taking into account the overlapping effect of diffusion of each waste source pile towards the other source piles. The final measurement is provided after the load cycle ends. During the load cycle, the location, date and time are recorded as well in step 634. In addition, each waste container is identified by at least one of or any combination of the waste container specific ID, type or purpose. All the data of the load cycle then processed and aggregated in step 652. Next, in step 662, the data is reported. Then in step 682 the system prepares to start the next measurement.

In an exemplary embodiment of the invention, the waste container purpose is identified in step 632 by the color of the waste container.

In an exemplary embodiment of the invention, container ID is identified by interpreting a visual marking on the waste container. Alternatively, the identification is made by electronic tagging signals, e.g., using RFIDs.

In an exemplary embodiment of the invention, the waste volume is calculated by setting a grid of adjacent different areas on the hopper and the total loaded volume is the integration of differences in the measurements of all points in the grid, and the specific loaded volume of each source is a weighted integration of the difference, wherein in each point on the grid, each source is assigned a contribution weight between 0 to 1 to indicate the volume contribution of each source to each grid point (each different area in the hopper).

In an exemplary embodiment of the invention, the waste measurement system is configured to calculate the waste volume of a waste container when the emptying of the container is done in two steps. A two steps scenario occurs when during emptying of a waste container the hopper become full. In this case, the garbage truck crew stops the loading of the hopper, compacts the hopper contacts, and then continues with loading the rest of the waste in the container into the now empty hopper. The measurement algorithms (the method) of the controller automatically identifies the two step scenario and accumulates the two partial volumes collected in each load cycle into a single reading of the waste volume emptied from the waste container.

In an exemplary embodiment of the invention, the waste measurement system is configured to measure bulk waste volume loaded separately to the hopper.

In an exemplary embodiment of the invention, the waste volume is calculated conditioned upon reading of a weight measurement received from a sensor located in the truck hopper.

In an exemplary embodiment of the invention, the reporting is done online with a cellular network. Additionally or optionally, the information is stored in a local storage, e.g., solid state disk drive, and fetched later on, using wired communication, e.g., USB cable.

Figure 12:
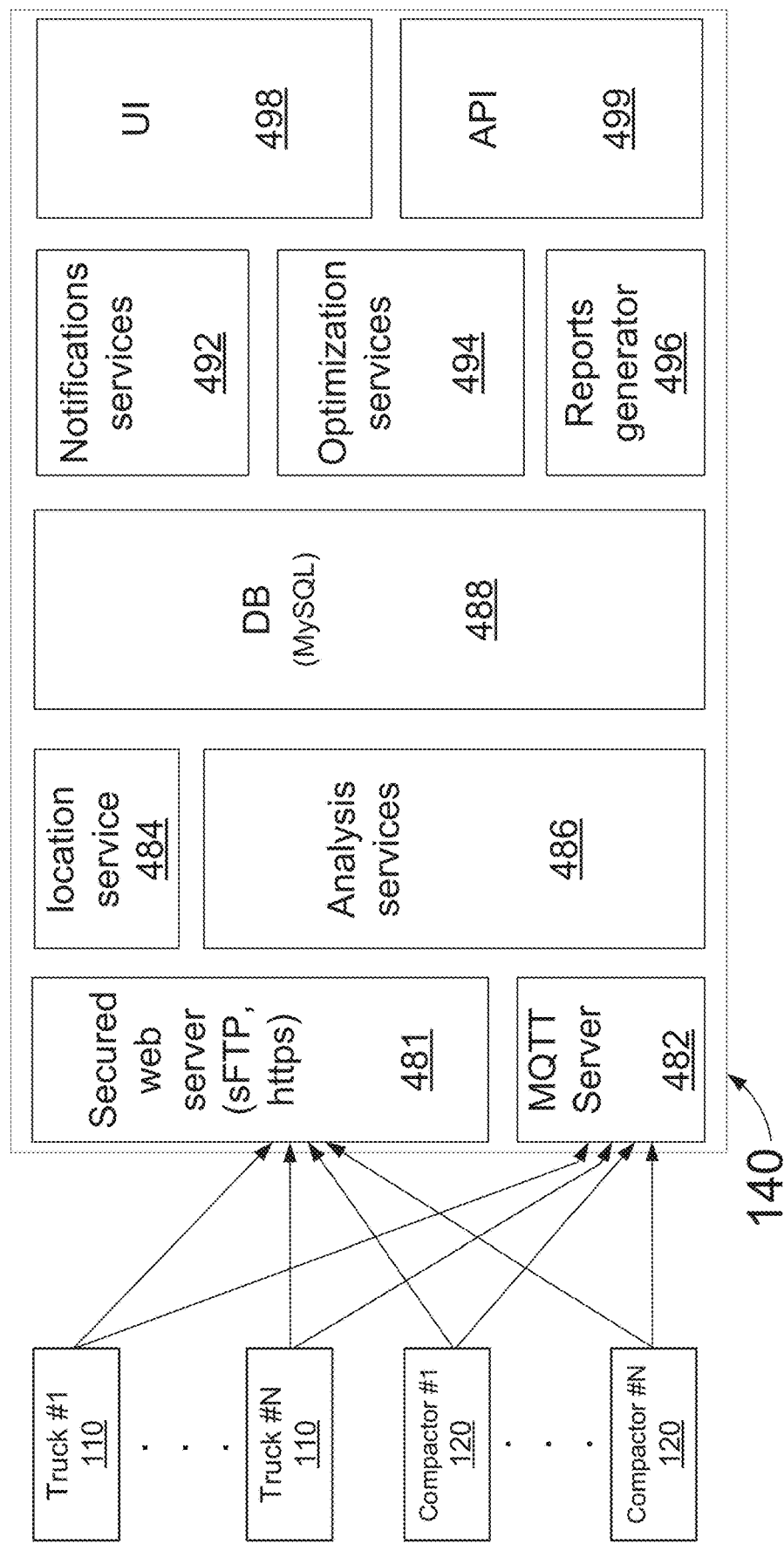
FIG. 12 is an exemplary logic block diagram of the server software implementation, in accordance with the present invention.

Reference is now made to FIG. 12. FIG. 12 illustrates an exemplary logic block diagram of the server software implementation, according to some embodiment of the present invention. The software runs on a server 140. Server 140 may be a single computer, a plurality of computers, one or more virtual machines or a bundle of services running in the cloud. The data is received from a plurality of trucks 110, each has a waste measurement device 500 (not shown in the figure), and a plurality of garbage compactors 120. Due to implementation considerations, the data is transferred using several protocols. A portion of the data is received by a secured web server 481 handling sFTP and https communication protocols, and other portions of the data is received by a Message Queue Telemetry Transport (MQTT) server 482 handling MQTT communication protocol.

The information regarding locations is processed by a location service module 484 and inserted into a database module 488. The database module is implemented using a standard open source MySQL database software package. The waste bin information is directed to an analysis service component 486. The analyzed data is stored in database 488 as well.

In parallel, online algorithms run in notification services 492 to check for irregularities during the waste collection procedure. The notifications are transferred to a UI module 498 that presents the notifications to the user. The system collects the data about the waste for each container. The system computes a waste generation rate for each specific container. Integrating all rates together creates a dynamic waste generation rate map for the entire garbage collection area. These maps are used by the optimization services module 494 in order to solve the optimization problem under the desired optimization criteria.

Using analysis service 486, the waste generation rate map, and conditioned upon the user's policy, optimization service module 494 produces recommendations for the waste collection procedure, e.g., the schedule and routes of trucks 110 in the truck fleet.

UI module 498 provides the interaction with the system users. In an exemplary embodiment of the invention, the user interface is web based and the user can login to a dashboard. In the dashboard the user can see live maps of waste collection plans and status, truck current and history locations, routes, waste containers information, statistics of various information, and notifications about problems that occurred during the waste collection procedure. The user can generate various reports using the report generator module 496.

An API service 499 enables sharing (receiving and/or transmitting) information with other IT systems such as city management system and the like. API service 499 may receive alerts from other IT servers such as blocked road events and the like.

Figure 14:
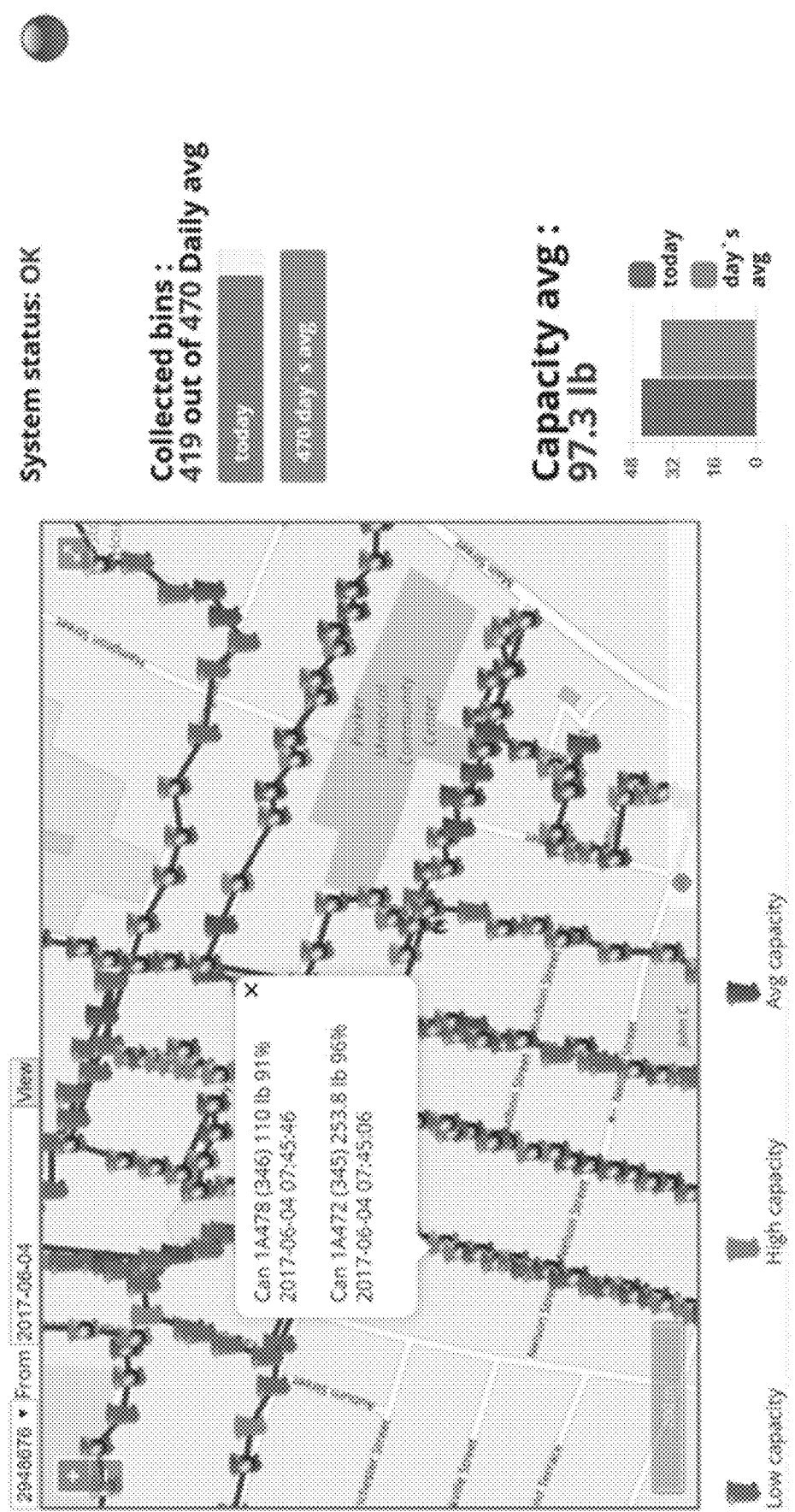
FIG. 14 is an exemplary screenshot of a map view of the routes and the actual collection locations of waste containers, in accordance with the present invention.

Reference is now made to FIGS. 13-15. FIGS. 13-15 illustrate exemplary screenshots from the system dashboard. FIG. 13 is a top level status screen presenting a summary of the garbage collection operation. The summary includes: the number of waste container collected and their average actual waste content relative to their capacity, notifications and recommendations.

FIG. 14 is a map view of the routes and the actual collection locations of waste containers, including a color code for high, low and average waste content collected by a single truck (designated as capacity in the screenshot).

FIG. 15 is a log of garbage collection where each entry in the log contains the data of a single waste container. Each record contains the pickup location, the ID of the waste container, the waste weight, the ratio, in percentage, between waste content collected and waste container capacity (designated as capacity in the screenshot), the pickup truck number, and the pickup time.

In an exemplary embodiment of the invention, the system manages waste pickup with a garbage truck fleet comprising a plurality of trucks, and each truck has a waste measurement device 500 which reports to the pickup service server. The server collects measurements from the waste measurement devices 500, and optimizes operation of the system, conditioned upon the measurements provided from the waste measurement devices 500. Optionally, the optimization is performed on at least one of or any combination of (a) total distance traveled by the fleet; (b) total fuel expenses of the truck fleet; (c) total pollutant emission of the truck fleet;

(d) total working hours of the crews that operate the truck fleet, (e) quality of service to the residences, (f) interference to the traffic.

The terms "comprises", "comprising", "includes", "including", "having" and their conjugates mean "including but not limited to".

As used herein, the singular form "a", "an" and "the" include plural references unless the context clearly dictates otherwise. For example, the term "a container" or "at least one container" may include a plurality of containers.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The invention claimed is:

1. A waste measurement device for use with a garbage truck comprising:
   (a) a case generally enclosing within:
      one or more visible light cameras;
      one or more volume sensors; and
      a controller,
   (b) an anchor suited to attach said device upon a wall of said garbage truck, above the hopper of said garbage truck;
   (c) a positioning arm bridging said anchor to said casing, said positioning arm extending said case away from said anchor; wherein the length of said arm deploys said visible light camera and said volume sensor, to a position above the content of a hopper and extended away from a wall of said garbage truck;
      wherein the waste measurement device is deployed externally relative to a hopper of the garbage truck,
      and wherein at least one field of view of said visible light cameras is directed from above said hopper, to view one or more waste containers during loading of said hopper with waste,
      and at least one fields of view of said volume sensors is directed from above said hopper, to view the waste in said garbage truck hopper,
      and wherein the controller is configured to measure the waste volume in the hopper using the volume sensors, and said controller measures the waste volume in the hopper before and after one or more waste containers are loaded to said hopper, wherein the controller calculates the waste volume emptied in each waste container by subtracting the hopper volume measurement taken before the waste containers is loaded to the hopper, from the hopper volume measurement taken after the waste containers is loaded into the hopper, and wherein the controller uses at least one of the visible light cameras to identify the capacity of the waste containers.

2. The device of claim 1, wherein at least one of the volume sensors further comprises an infra-red transmitter and an infra-red receiver.

3. The device of claim 1, wherein said at least one of the volume sensors further comprises an ultrasound transmitter and an ultrasound receiver.

4. The device of claim 1, wherein said one or more volume sensors comprises at least two volume sensors that measure said volume using a plurality of types of radiation or a plurality of frequency bands.

5. The device of claim 1, wherein the device further utilizes a GPS locating means.

6. The device of claim 1, wherein the device further comprises a wireless communication modem and the measurements are reported to a waste pickup service using said wireless communication modem.

7. The device of claim 1, wherein the controller is configured to measure a waste volume for each waste container, when a plurality of waste containers is loaded together in a single load cycle of the garbage truck.

8. The device of claim 1, wherein the controller is configured to measure a waste volume of bulk waste.

9. The device of claim 1, wherein the controller is configured to receive supplementary information from other devices in the garbage truck.

10. A waste measurement device for use with a garbage truck comprising:
    a case generally enclosing within:
       (a) one or more volume sensors; and
       (b) a controller,
    an anchor suited to attach said device upon a wall of said garbage truck, above the hopper of said garbage truck;
    a positioning arm bridging said anchor to said casing, said positioning arm extending said case away from said anchor; wherein the length of said arm deploys said volume sensor, to a position above the content of a hopper and extended away from a wall of said garbage truck;
       wherein the waste measurement device is deployed externally relative to a hopper of the garbage truck, and wherein at least one fields of view of said volume sensors is directed from above said hopper to view the waste in said garbage truck hopper, and wherein the controller is configured to measure the waste volume in the hopper using the volume sensors, and said controller measures the waste volume in the hopper before and after one or more waste containers are loaded to said hopper, wherein the controller calculates the waste volume emptied in each waste container by subtracting the hopper volume measurement taken before the waste containers is loaded to the hopper, from the hopper volume measurement taken after the waste containers is loaded into the hopper, and wherein the controller uses at least one of the volume sensors to identify the capacity of the waste containers.

* * * * *